United States Patent
Mikawa et al.

(10) Patent No.: US 10,630,226 B2
(45) Date of Patent: Apr. 21, 2020

(54) MOTOR DRIVE CONTROLLER AND METHOD FOR DETECTING ABNORMALITY IN MOTOR POWER SUPPLY LINE

(71) Applicant: HITACHI AUTOMOTIVE SYSTEMS, LTD., Hitachinaka-shi, Ibaraki (JP)

(72) Inventors: Kentaro Mikawa, Isesaki (JP); Naoki Okamoto, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/491,536

(22) PCT Filed: Sep. 20, 2018

(86) PCT No.: PCT/JP2018/034817
§ 371 (c)(1),
(2) Date: Sep. 5, 2019

(87) PCT Pub. No.: WO2019/073773
PCT Pub. Date: Apr. 18, 2019

(65) Prior Publication Data
US 2020/0014325 A1 Jan. 9, 2020

(30) Foreign Application Priority Data
Oct. 11, 2017 (JP) .................. 2017-197895

(51) Int. Cl.
*H02P 29/024* (2016.01)
(52) U.S. Cl.
CPC .................. *H02P 29/027* (2013.01)

(58) Field of Classification Search
CPC .. H02M 7/5387; H02P 29/032; H02P 29/027; H02P 3/22; H02P 29/028
See application file for complete search history.

(56) References Cited

U.S. PATENT DOCUMENTS

| | | | |
|---|---|---|---|
| 2008/0094762 A1* | 4/2008 | Ochiai | H02H 3/05 361/24 |
| 2009/0021207 A1* | 1/2009 | Kezobo | B62D 5/0484 318/798 |

(Continued)

FOREIGN PATENT DOCUMENTS

| | | |
|---|---|---|
| JP | 2005-009480 A | 1/2005 |
| JP | 2009-159689 A | 7/2009 |

(Continued)

*Primary Examiner* — Thai T Dinh
(74) *Attorney, Agent, or Firm* — Foley & Lardner LLP

(57) ABSTRACT

A motor drive controller comprises: a driver unit comprising semiconductor switches (SW1-SW4) for adjusting power supplied to a motor; a control unit for outputting, to the driver unit, a control signal (PWM1, PWM2) for controlling on and off of the semiconductor switches (SW1-SW4); and an overcurrent monitoring unit for monitoring for an overcurrent at multiple locations in the driver unit. The control unit outputs, to the driver unit at a predetermined timing, the control signal for forcibly maintaining the semiconductor switches at at least two different on-off combination settings (M2) one after another for a predetermine time per each on-off combination setting. Each time the predetermined time has elapsed, the control unit detects whether and which of abnormalities due to short-to-ground and short-to-supply has occurred in a motor power supply line connecting the motor to the driver unit, based on where an overcurrent is detected in the driver unit.

15 Claims, 20 Drawing Sheets

(56) References Cited

U.S. PATENT DOCUMENTS

| | | | |
|---|---|---|---|
| 2010/0273072 A1 | 10/2010 | Hasegawa et al. | |
| 2013/0314013 A1* | 11/2013 | Ajima | H02P 23/00 |
| | | | 318/400.21 |
| 2014/0203751 A1* | 7/2014 | Kurosawa | H02P 25/028 |
| | | | 318/565 |
| 2017/0033725 A1* | 2/2017 | Koseki | B62D 5/0484 |
| 2018/0175779 A1 | 6/2018 | Koseki et al. | |

FOREIGN PATENT DOCUMENTS

| | | |
|---|---|---|
| JP | 2015-202019 A | 11/2015 |
| JP | 2017-063571 A | 3/2017 |

* cited by examiner

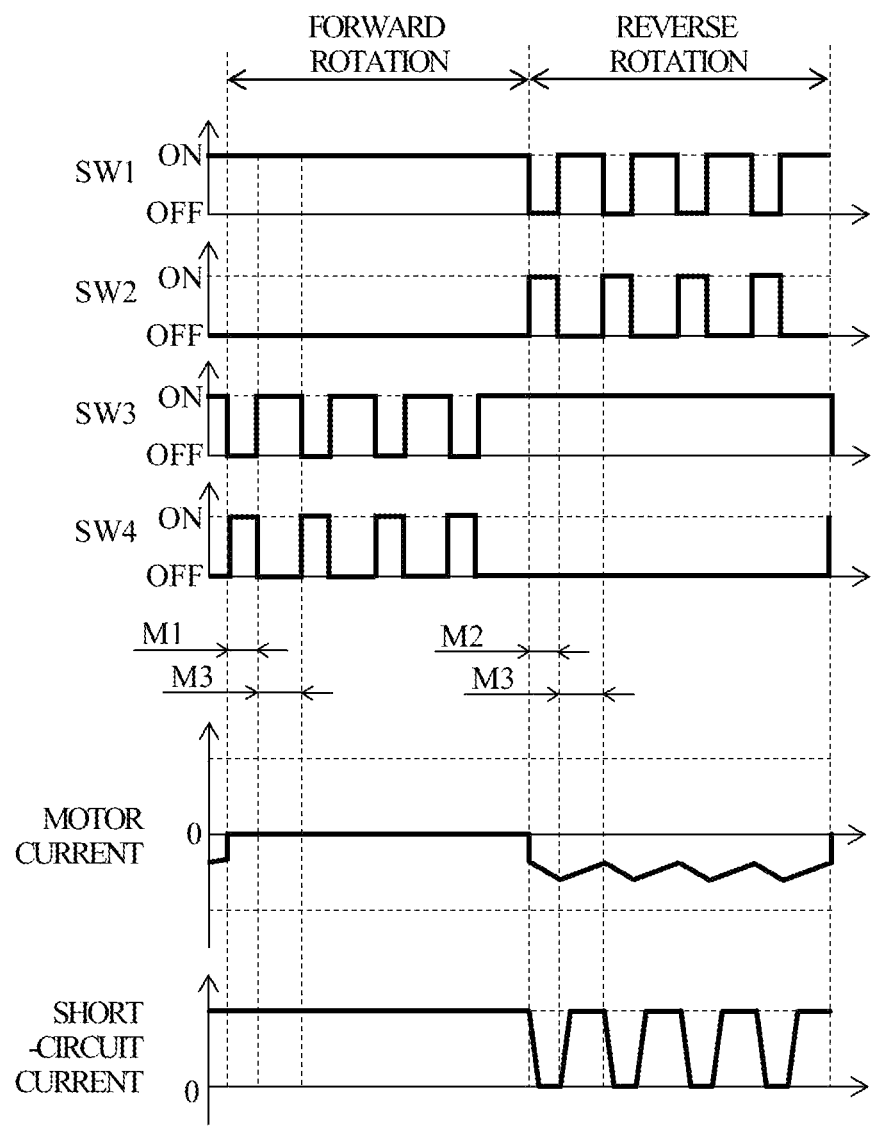

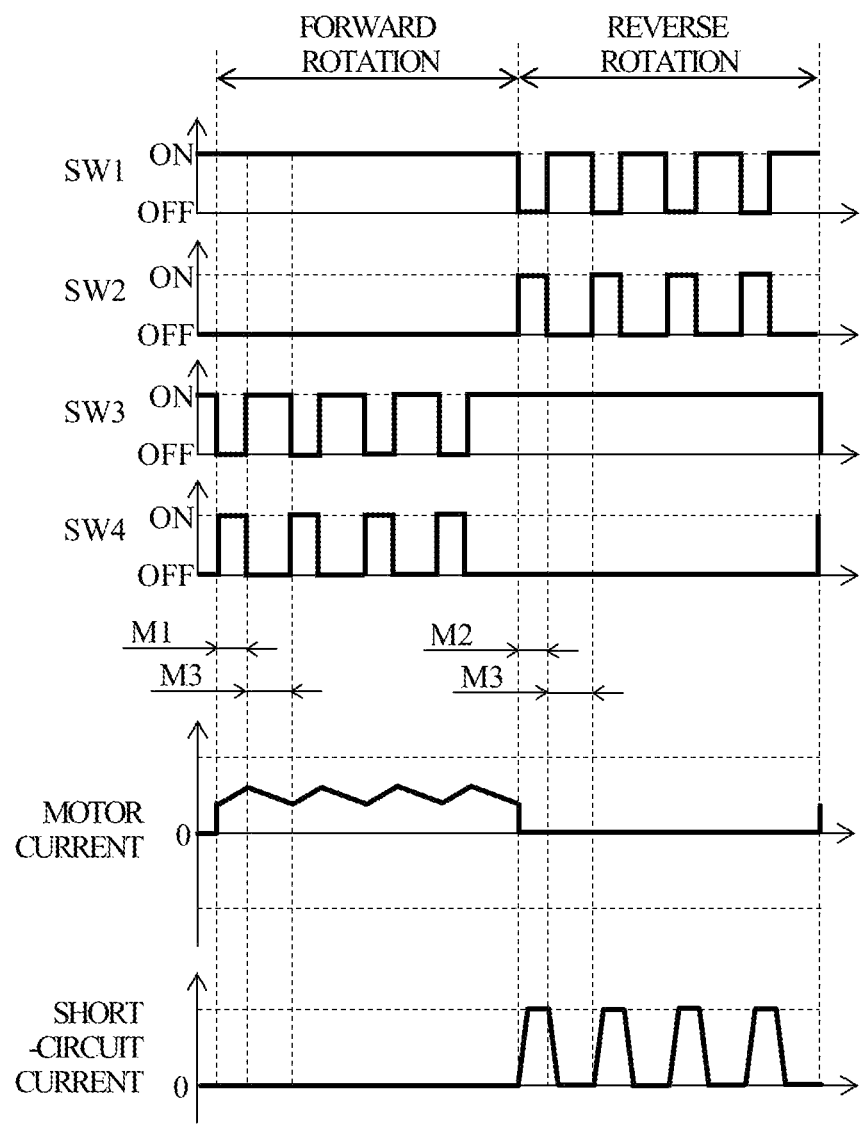

MOTOR DRIVE CONTROLLER AND METHOD FOR DETECTING ABNORMALITY IN MOTOR POWER SUPPLY LINE

TECHNICAL FIELD

The present invention relates to a motor drive controller and to a method for detecting an abnormality in a motor power supply line.

BACKGROUND ART

Known examples of conventional motor drive controllers includes a motor drive controller as disclosed in Patent Document 1. Specifically, the motor drive controller, which is used as a driver unit for a motor configured to rotate the camshaft so as to adjust a rotational phase difference between the crankshaft and the camshaft in a variable valve timing mechanism for an internal combustion engine of a vehicle, has a so-called H-bridge circuit.

REFERENCE DOCUMENT LIST

Patent Document

Patent Document 1: JP 2005-009480 A

SUMMARY OF THE INVENTION

Problem to be Solved by the Invention

When an abnormality due to short-to-ground or short-to-supply has occurred in the motor power supply line connecting the motor to the driver unit of the motor drive controller, the abnormality causes a short-circuit current. Such a short-circuit current continues to flow as long as the on-off combination setting of the semiconductor switches in the H-bridge circuit is maintained unchanged. In other words, such continuous flow of a short-circuit current may be interrupted by operations for making the rotational phase difference between the crankshaft and camshaft follow the target value, i.e., by repeatedly switching on and off the semiconductor switches in the H-bridge circuit or by causing the motor to rapidly and repeatedly switch between forward and reverse rotations. In this case, even if the motor drive controller detects an overcurrent, the motor drive controller may hardly identify whether the detected overcurrent is a mere electrical noise or a short-circuit current due to an abnormality in the motor power supply line.

In view of the above problems, the present invention has been made to provide a motor drive controller and a method for detecting an abnormality in a motor power supply line which facilitate detection of an abnormality in the motor power supply line.

Means for Solving the Problem

To this end, a motor drive controller according to the present invention comprises: a driver unit comprising a plurality of semiconductor switches for adjusting power to be supplied to a motor; a control unit configured to output, to the driver unit, a control signal for controlling on and off of the plurality of semiconductor switches; and an overcurrent monitoring unit configured to monitor for an overcurrent at a plurality of locations in the driver unit. The control unit outputs, to the driver unit at a predetermined timing, the control signal for forcibly maintaining the plurality of semi- conductor switches at at least two different on-off combination settings one after another in a manner that each on-off combination setting is maintained for a predetermine time. Each time the predetermined time has elapsed, the control unit performs abnormality detection to detect whether and which of an abnormality due to short-to-ground and an abnormality due to short-to-supply has occurred in a motor power supply line that connects the motor to the driver unit, based on a location where an overcurrent is detected in the driver unit.

A method for detecting an abnormality in a motor power supply line according to the present invention is applicable to the motor power supply line that connects a motor to a driver unit comprising a plurality of semiconductor switches for adjusting power to be supplied to the motor. Specifically, the method comprises: outputting, to the driver unit at a predetermined timing, a control signal for forcibly maintaining the plurality of semiconductor switches at at least two different on-off combination settings one after another in a manner that each on-off combination setting is maintained for a predetermine time; monitoring for an overcurrent at a plurality of locations in the driver unit; and detecting, each time the predetermined time has elapsed, whether and which of an abnormality due to short-to-ground and an abnormality due to short-to-supply has occurred in the motor power supply line, based on a location where an overcurrent is detected in the driver unit.

Effects of the Invention

The motor drive controller and the method for detecting an abnormality in a motor power supply line according to the present invention are able to facilitate detection of an abnormality in the motor power supply line.

BRIEF DESCRIPTION OF THE DRAWINGS

FIG. 5 is a timing chart schematically illustrating temporal changes of currents observed upon the first short-to-ground fault.

FIG. 9 is a timing chart schematically illustrating temporal changes of currents observed upon the first short-to-supply fault.

MODE FOR CARRYING OUT THE INVENTION

An embodiment of the present invention will be described in detail below with reference to the accompanying drawings.

Figure 1:
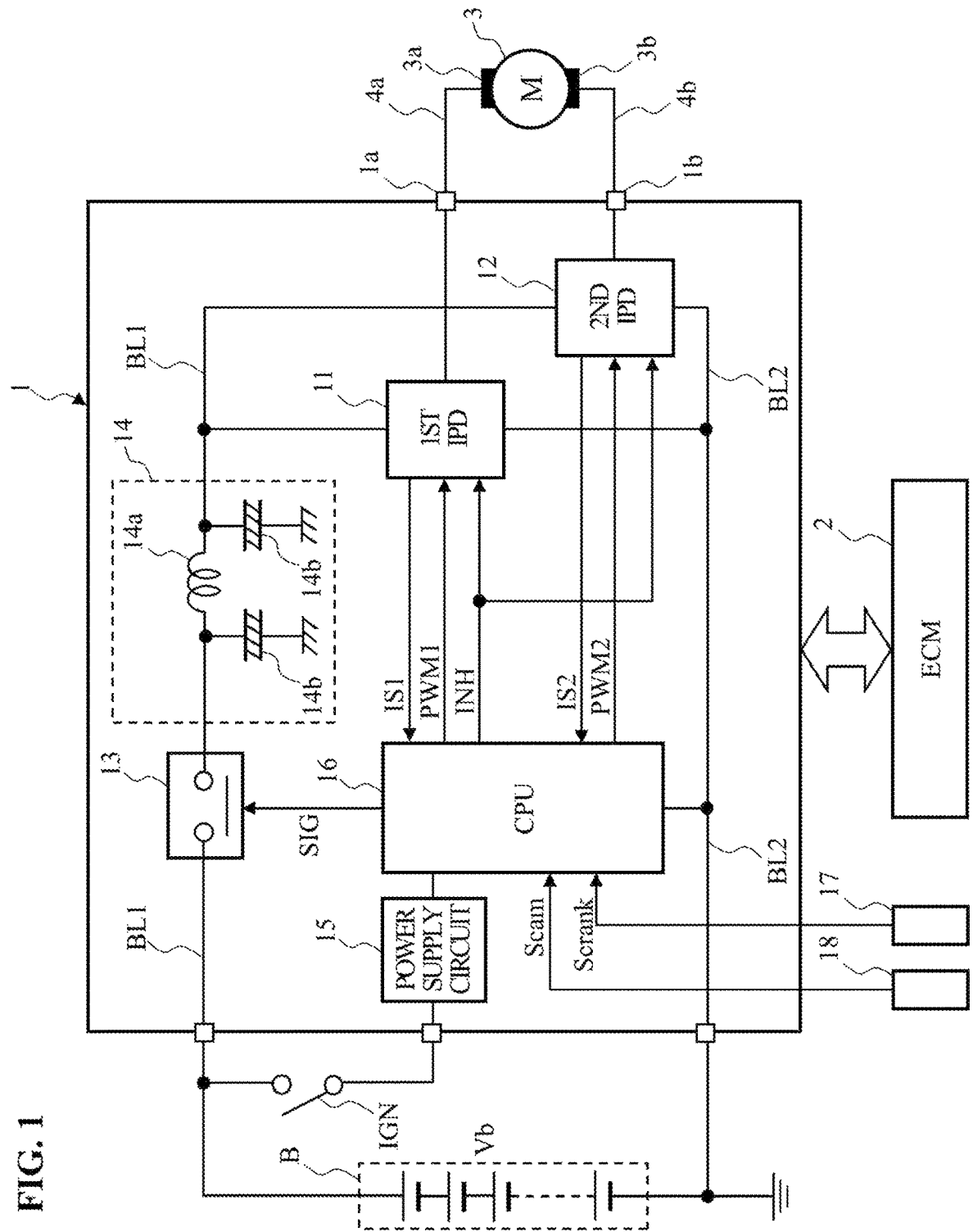
FIG. 1 is a schematic view of an example of a motor drive controller according to the present invention.

FIG. 1 shows an example of a motor drive controller according to the present invention.

Internal Configuration of Motor Drive Controller

A motor drive controller 1 controls drive of motor 3 based on a command signal from an electric control module (ECM) 2, which is a host controller for motor drive controller 1. ECM 2 is communicatively connected to motor drive controller 1 by a controller area network (CAN) or the like. Motor 3 is a DC commutator motor. Motor 3 and motor drive controller 1 are separated from each other, and connected to each other by electric harnesses 4a, 4b.

In this embodiment, motor 3 is provided in a variable valve timing mechanism configured to continuously change valve timings in an internal combustion engine. Motor 3 is used as a drive actuator for rotationally driving the camshaft in order to advance or retard the rotational phase of the camshaft with respect to the rotational phase of the crankshaft; that is, in order to control the valve timing control (VTC) angle as a control variable. However, motor 3 may be used not only as a drive actuator for a variable valve timing mechanism but also as a drive actuator for another in-vehicle system. For example, motor 3 may be applicable to a variable compression ratio mechanism configured to change the compression ratio by changing a top dead center position of each piston and to a variable valve mechanism configured to change a lift amount and an open period of each intake valve.

Motor drive controller 1 includes a first intelligent power device 11 and a second intelligent power device 12, which constitute a driver unit configured to adjust DC power supplied from an in-vehicle battery B, which is a DC power source, to power adapted to be supplied to motor 3. Hereinafter, first intelligent power device 11 will be abbreviated as first IPD 11, and second intelligent power device 12 will be abbreviated as second IPD 12. First IPD 11 and second IPD 12 are connected in parallel between a positive feed line BL1 and a negative feed line BL2, which are respectively connected to the positive electrode and the negative electrode of in-vehicle battery B. Via an output terminal 1a of motor drive controller 1, first IPD 11 is connected to a motor terminal 3a of motor 3 through electric harness 4a. Via an output terminal 1b of motor drive controller 1, second IPD 12 is connected to the other motor terminal 3b of motor 3 through electric harness 4b.

A semiconductor relay 13 and a smoothing circuit 14 are interposed in positive feed line BL1. Semiconductor relay 13 is configured to receive an external control signal SIG and controllable to be turned on and off in response to the control signal SIG. When turned on, semiconductor relay 13 permits power supply to first IPD 11 and second IPD 12. When turned off, semiconductor relay 13 interrupts power supply to first IPD 11 and second IPD 12. Smoothing circuit 14 is configured to reduce AC components in power supplied from in-vehicle battery B. As shown in FIG. 1, smoothing circuit 14 may, for example, be formed of a π-filter having a coil 14a and two capacitors 14b. Coil 14a are interposed in positive feed line BL1. The opposite ends of coil 14a are grounded via two respective capacitors 14b.

Motor drive controller 1 incorporates a central processing unit (CPU) 16 as a control unit. CPU 16 receives power supply from a power supply circuit 15 included in motor drive controller 1 and configured to perform drive control processing on motor 3. Power supply circuit 15 is supplied with power from in-vehicle battery B when an ignition switch IGN is turned on.

Based on a command signal from ECM 2, CPU 16 determines a target VTC angle which is a target value of the VTC angle. Based on an output signal Scrank from a crank angle sensor 17 and an output signal Scam from a cam angle sensor 18, CPU 16 calculates an actual VTC angle. Crank angle sensor 17 is configured to measure the rotational phase of the crankshaft. Cam angle sensor 18 is configured to measure the rotational phase of the camshaft. Based on the difference between the target VTC angle and the actual VTC angle, CPU 16 then determines the duty cycle of a pulse width modulation signal PWM1 to be output to first IPD 11 and the duty cycle of a pulse width modulation signal PWM2 to be output to second IPD 12. Then, CPU 16 outputs the pulse width modulation signals PWM1, PWM2 having the determined duty cycles to first IPD 11 and second IPD 12, respectively, thereby performing feedback (FB) control.

In addition to drive control processing on motor 3, CPU 16 also performs diagnostic processing based on an overcurrent detection signal IS1 from first IPD 11 and an overcurrent detection signal IS2 from second IPD 12, as will be described later. The diagnostic processing is performed for making an abnormality diagnosis on a motor power supply line connecting first IPD 11 and second IPD 12 to motor 3. The motor power supply line includes electric harnesses 4a, 4b and the following line segments. Specifically, the motor power supply line includes the line segment from first IPD 11 to output terminal 1a and the line segment from second IPD 12 to output terminal 1b in the circuit of motor drive controller 1. In addition, the motor power supply line also includes the line segment from motor terminal 3a to one of the brushes of motor 3 and the line segment from motor terminal 3b to the other brush in the circuit of in motor 3. CPU 16 is configured to output the control signal SIG for turning off semiconductor relay 13 to semiconductor relay 13, based on the abnormality diagnosis. CPU 16 is configured also to output, to first IPD 11 and second IPD 12, an output limiting signal INH for interrupting power supply from first IPD 11 and second IPD 12 to motor 3.

Internal Configuration of IPD

Figure 2:
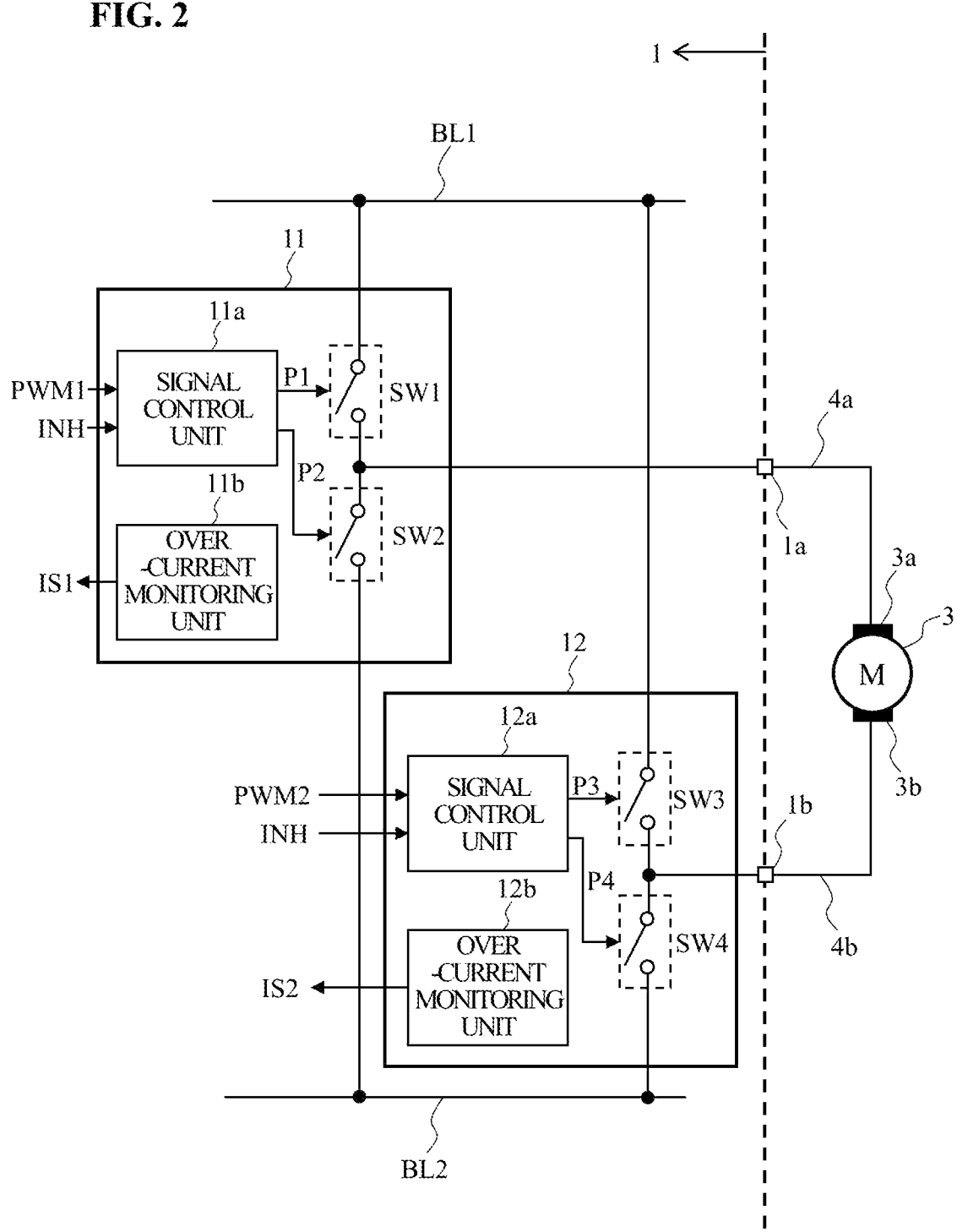
FIG. 2 is a schematic view showing internal configurations of IPDs in the motor drive controller.

FIG. 2 shows the internal configurations of the IPDs in the motor drive controller. As shown in FIG. 2, first IPD 11 has a semiconductor switch SW1 and a semiconductor switch SW2 connected in series between positive feed line BL1 and negative feed line BL2. Similarly, second IPD 12 has a semiconductor switch SW3 and a semiconductor switch SW4 connected in series between positive feed line BL1 and negative feed line BL2. Various semiconductor switching elements, such as bipolar transistors and field effect transistors, may be used as semiconductor switches SW1-SW4. The on and off of semiconductor switches SW1, SW2 are controlled based on the pulse width modulation signal PWM1, which is a control signal output from CPU 16 to first IPD 11. The on and off of semiconductor switches SW3, SW4 are controlled based on the pulse width modulation signal PWM2, which is a control signal output from CPU 16 to second IPD 12.

A point between semiconductor switches SW1 and SW2 in first IPD 11 is connected to motor terminal 3a of motor 3. A point between semiconductor switches SW3 and SW4 in second IPD 12 is connected to the other motor terminal 3b of motor 3. Thereby, semiconductor switches SW1, SW2 respectively constitute upper and lower arms of first IPD 11, and semiconductor switches SW3, SW4 respectively constitute upper and lower arms of second IPD 12. First IPD 11 and second IPD 12 constitute an H-bridge circuit configured to use semiconductor switches SW1-SW4 to rotationally drive motor 3 in the forward and reverse directions.

First IPD 11 includes a signal control unit 11a configured to output control signals P1, P2 respectively to semiconductor switches SW1, SW2 based on the pulse width modulation signal PWM1 received from CPU 16. Specifically, to lower-arm semiconductor switch SW2, signal control unit 11a outputs the control signal P2 corresponding to the pulse width modulation signal PWM1. To upper-arm semiconductor switch SW1, signal control unit 11a outputs the control signal P1 corresponding to a signal obtained by inverting the pulse width modulation signal PWM1. Furthermore, based on the output limiting signal INH received from CPU 16, signal control unit 11a outputs the control signals P1, P2 for forcibly turning off both semiconductor switches SW1, SW2 regardless of the pulse width modulation signal PWM1.

Similarly, second IPD 12 includes a signal control unit 12a configured to output control signals P3, P4 respectively to semiconductor switches SW3, SW4 based on the pulse width modulation signal PWM2 received from CPU 16. Specifically, to lower-arm semiconductor switch SW4, signal control unit 12a outputs the control signal P4 corresponding to the pulse width modulation signal PWM2. To upper-arm semiconductor switch SW3, signal control unit 12a outputs the control signal P3 corresponding to a signal obtained by inverting the pulse width modulation signal PWM2. Furthermore, based on the output limiting signal INH received from CPU 16, signal control unit 12a outputs the control signals P3, P4 for forcibly turning off both semiconductor switches SW3, SW4 regardless of the pulse width modulation signal PWM2.

First IPD 11 includes an overcurrent monitoring unit 11b configured to monitor for an overcurrent in semiconductor switches SW1, SW2. Second IPD 12 includes an overcurrent monitoring unit 12b configured to monitor for an overcurrent in semiconductor switches SW3, SW4. Overcurrent monitoring unit 11b outputs the overcurrent detection signal IS1 to CPU 16 when detecting an overcurrent in first IPD 11. Overcurrent monitoring unit 12b outputs the overcurrent detection signal IS2 to CPU 16 when detecting an overcurrent in second IPD 12.

Drive Control Processing on Motor

Figure 3:
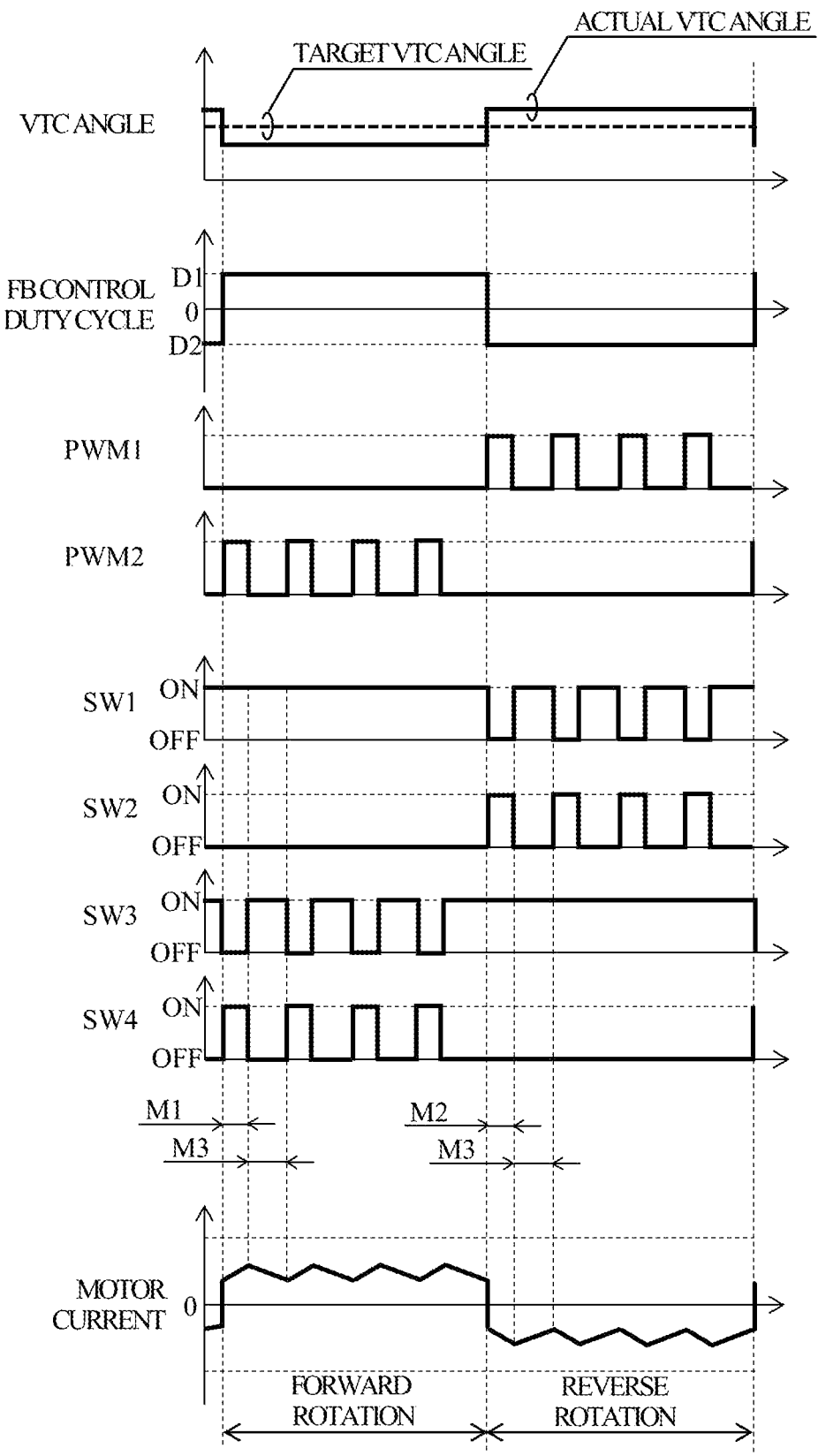
FIG. 3 is a control timing chart illustrating drive control processing on a motor.

FIG. 3 shows temporal changes of the various parameters in the drive control processing on motor 3. In the drive control processing on motor 3, CPU 16 uses proportional-integral (PI) control to calculate a FB control duty cycle based on a difference between the actual VTC angle (actual value of a control variable) and the target VTC angle (target value of the control variable). The FB control duty cycle is a percentage indicating "on" time ratios of semiconductor switches SW1-SW4 in the repeated switching between on and off of semiconductor switches SW1-SW4. When the actual VTC angle is smaller than the target VTC angle, the FB control duty cycle is calculated, for example, as a positive value D1 [%]. On the other hand, when the actual VTC angle is greater than the target VTC angle, the FB control duty cycle is calculated as, for example, a negative value D2 [%].

When the FB control duty cycle is calculated as the positive value D1 [%], CPU 16 sets the duty cycle of the pulse width modulation signal PWM1 to 0 [%] and sets the duty cycle of the pulse width modulation signal PWM2 to D1 [%]. On the other hand, when the FB control duty cycle is calculated as the negative value D2 [%], CPU 16 sets the duty cycle of the pulse width modulation signal PWM2 to 0 [%] and sets the duty cycle of the pulse width modulation signal PWM1 to the absolute value of D2 [%]. Then, CPU 16 outputs the pulse width modulation signals PWM1, PWM2 having their determined duty cycles to first IPD 11 and second IPD 12, respectively.

In first IPD 11, when signal control unit 11a receives the pulse width modulation signal PWM1 having the determined duty cycle of 0 [%], signal control unit 11a outputs the control signals P1, P2 in the following manner. Specifically, signal control unit 11a outputs the control signal P1 having a duty cycle of 100 [%] to upper-arm semiconductor switch SW1, and outputs the control signal P2 having a duty cycle of 0 [%] to lower-arm semiconductor switch SW2. On the other hand, when signal control unit 11a receives the pulse width modulation signal PWM1 having the determined duty cycle of the absolute value of D2 [%], signal control unit 11a outputs the control signals P1, P2 in the following manner. Specifically, signal control unit 11a outputs the control signal P1 having a duty cycle of (100−|D2|) [%] to upper-arm semiconductor switch SW1, and outputs the control signal P2 having a duty cycle of the absolute value of D2 [%] to lower-arm semiconductor switch SW2. In this way, semiconductor switches SW1, SW2 are controlled by complementary pulse width modulation (PWM) for turning on one of semiconductor switches SW1, SW2 and turning off the other at a time.

In second IPD 12, when signal control unit 12a receives the pulse width modulation signal PWM2 having the determined duty cycle of D1 [%], signal control unit 12a outputs the control signals P3, P4 in the following manner. Specifically, signal control unit 12a outputs the control signal P3 having a duty cycle of (100−D1) [%] to upper-arm semiconductor switch SW3, and outputs the control signal P4 having a duty cycle of D1 [%] to lower-arm semiconductor switch SW4. On the other hand, when signal control unit 12a receives the pulse width modulation signal PWM2 having the determined duty cycle of 0 [%], signal control unit 12a outputs the control signals P3, P4 in the following manner. Specifically, signal control unit 12a outputs the control signal P3 having a duty cycle of 100 [%] to upper-arm semiconductor switch SW3, and outputs the control signal P4 having a duty cycle of 0 [%] to lower-arm semiconductor switch SW4. In this way, semiconductor switches SW3, SW4 are controlled by complementary pulse width modulation (PWM) for turning on one of semiconductor switches SW3, SW4 and turning off the other at a time.

As used herein, a drive mode M1 corresponds to an on-off combination of semiconductor switches SW1-SW4 in which upper-arm semiconductor switch SW1 turns on in first IPD 11 and lower-arm semiconductor switch SW4 turns on in second IPD 12, which occurs when the FB control duty cycle is set to the positive value D1 [%]. In the drive mode M1, a current from in-vehicle battery B flows sequentially through positive feed line BL1, semiconductor switch SW1, motor 3 (from motor terminal 3a to motor terminal 3b), semiconductor switch SW4, and negative feed line BL2. It is assumed herein that, in the drive mode M1, a motor current flowing through motor 3 has a positive value and motor 3 rotates in the forward direction (motor 3 is in forward rotation).

On the other hand, a drive mode M2 corresponds to an on-off combination of semiconductor switches SW1-SW4 in which upper-arm semiconductor switch SW3 turns on in second IPD 12 and lower-arm semiconductor switch SW2 turns on in first IPD 11, which occurs when the FB control duty cycle is set to the negative value D2 [%]. In the drive mode M2, a current from in-vehicle battery B flows sequentially through positive feed line BL1, semiconductor switch SW3, motor 3 (from motor terminal 3b to motor terminal 3a), semiconductor switch SW2, and negative feed line BL2. It is assumed herein that, in the drive mode M2, a motor current flowing through motor 3 has a negative value and motor 3 rotates in the reverse direction (motor 3 is in reverse rotation).

After semiconductor switches SW1-SW4 are set at the on-off combination setting corresponding to the drive mode M1, when semiconductor switch SW4 switches from on to off in response to the pulse width modulation signal PWM2, semiconductor switch SW3 switches from off to on by complementary PWM control. A drive mode M3 corresponds to the resultant on-off combination of semiconductor switches SW1-SW4. In the drive mode M3 at that time, a motor current caused by a back electromotive voltage to flow through motor 3 from motor terminal 3a to motor terminal 3b passes sequentially through semiconductor switch SW3 in second IPD 12, positive feed line BL1, and semiconductor switch SW1 in first IPD11. As a result, the motor current caused by the back electromotive voltage flows back to motor terminal 3a of motor 3 and gradually decays during such recirculation. This prevents or reduces possible failure of components such as semiconductor switches SW1-SW4 due to the back electromotive voltage in motor 3.

After semiconductor switches SW1-SW4 are set at the on-off combination setting corresponding to the drive mode M2, when semiconductor switch SW2 switches from on to off in response to the pulse width modulation signal PWM1, semiconductor switch SW1 switches from off to on by complementary PWM control. The drive mode M3 corresponds also to the resultant on-off combination of semiconductor switches SW1-SW4. In the drive mode M3 at that time, a motor current caused by a back electromotive voltage to flow through motor 3 from motor terminal 3b to motor terminal 3a passes sequentially through semiconductor switch SW1 in first IPD 11, positive feed line BL1, and semiconductor switch SW3 in second IPD 12. As a result, the motor current caused by the back electromotive voltage flows back to motor terminal 3b of motor 3 and gradually decays during such recirculation. This prevents or reduces possible failure of components such as semiconductor switches SW1-SW4 due to the back electromotive voltage in motor 3.

Types of Abnormality in Motor Power Supply Line

Before the diagnostic processing on the motor power supply line is described, types of abnormality in the motor power supply line and how a motor current and a short-circuit current flow upon occurrence of each type of abnormality will be described with reference to FIGS. 4A to 11. Abnormalities in the motor power supply line are classified into types of a first short-to-ground fault, a second short-to-ground fault, a first short-to-supply fault, and a second short-to-supply fault, as will be described later.

First Short-to-Ground Fault

Figure 4A:
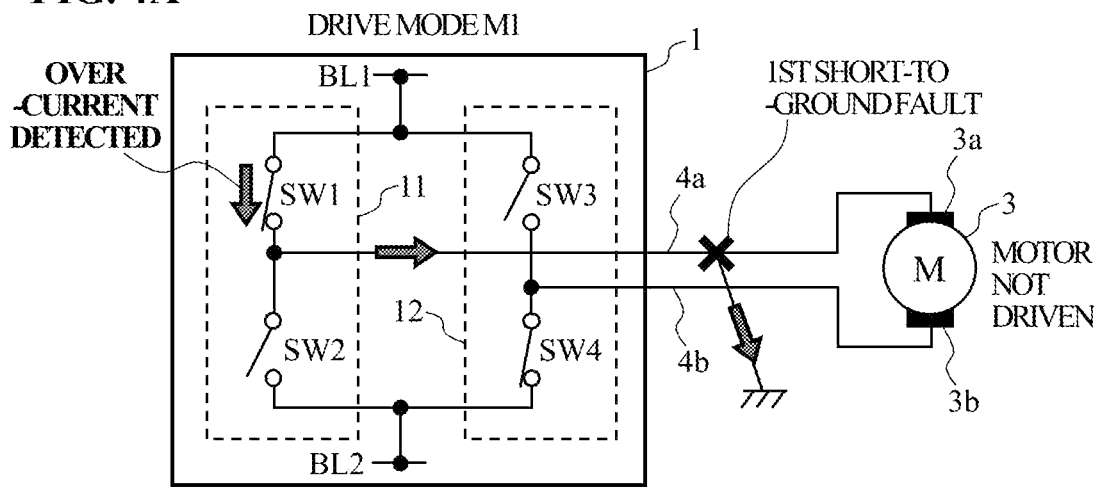
FIGS. 4A to 4C are schematic views each showing a current path created upon a first short-to-ground fault.
Figure 4B:
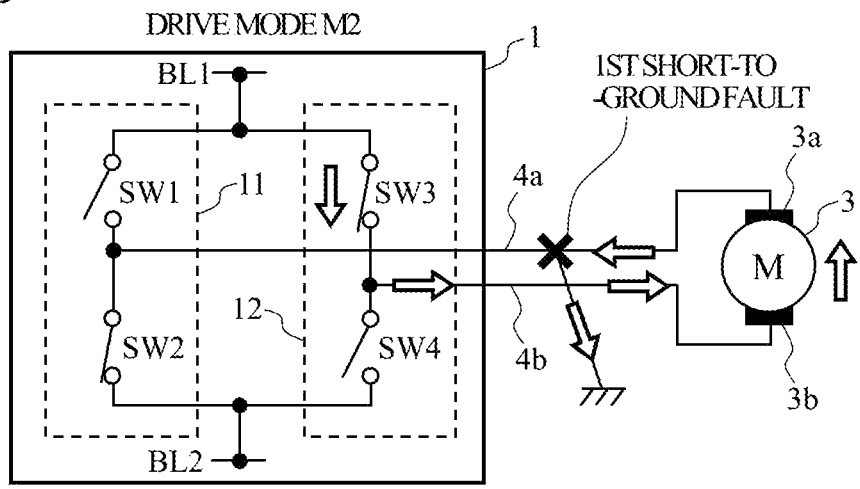
Figure 4C:
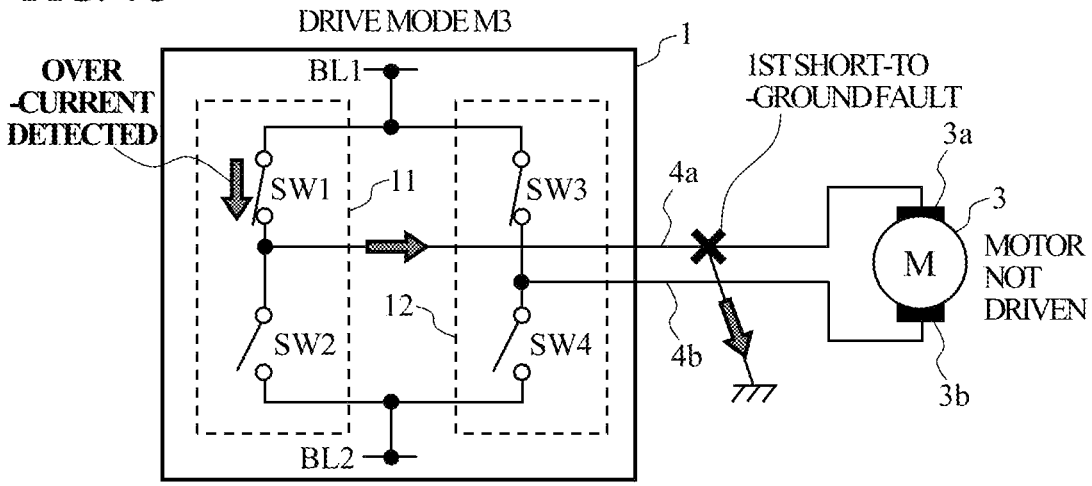

FIGS. 4A to 4C each show a current path created when the first short-to-ground fault has occurred. FIG. 5 shows temporal changes of the motor current and the short-circuit current observed when the first short-to-ground fault has occurred. As used herein, the first short-to-ground fault refers to a relatively low impedance electrical connection that accidentally occurs between the ground and electric harness 4a in the motor power supply line. Note that the first short-to-ground fault may occur also in other line segments of the motor power supply line; that is, in the line segment between first IPD 11 and output terminal 1a or in the line segment between motor terminal 3a and one of the brushes. However, in the following description, electric harness 4a will be used as a representative location at which the first short-to-ground fault occurs. The same applies to the first short-to-supply fault, which will be described later.

In the drive mode M1 shown in FIG. 4A and the drive mode M3 shown in FIG. 4C, when the first short-to-ground fault has occurred, a current supplied from in-vehicle battery B flows sequentially through positive feed line BL1, semiconductor switch SW1, and electric harness 4a, and flows from the short-to-ground location of electric harness 4a directly to the ground. Thus, as shown in FIG. 5, in the drive mode M1 and in the drive mode M3 that is switched from the drive mode M1, the motor current is substantially zero and motor 3 is not driven. In the drive mode M3 that is switched from the drive mode M2, the motor current flows due to the back electromotive voltage in motor 3. However, the current from in-vehicle battery B does not flow through motor 3 due to the back electromotive voltage in motor 3 and does not contribute to the drive of motor 3. Accordingly, in the drive modes M1, M3, when the first short-to-ground fault has occurred, a short-circuit current from the positive electrode of in-vehicle battery B to the ground flows through first IPD 11. In this case, overcurrent monitoring unit 11b detects the short-circuit current as an overcurrent and outputs the overcurrent detection signal IS1.

In the drive mode M2 shown in FIG. 4B, when the first short-to-ground fault has occurred, a current supplied from in-vehicle battery B flows sequentially through positive feed line BL1, semiconductor switch SW3, motor 3 (from motor terminal 3b to motor terminal 3a) and electric harness 4a, and flows from the short-to-ground location of electric harness 4a to the ground. Thus, as shown in FIG. 5, a negative motor current flows through motor 3 so as to rotationally drive motor 3 in the reverse direction and there is thus no short-circuit current flowing from the positive electrode of in-vehicle battery B to the ground.

Second Short-to-Ground Fault

Figure 6A:
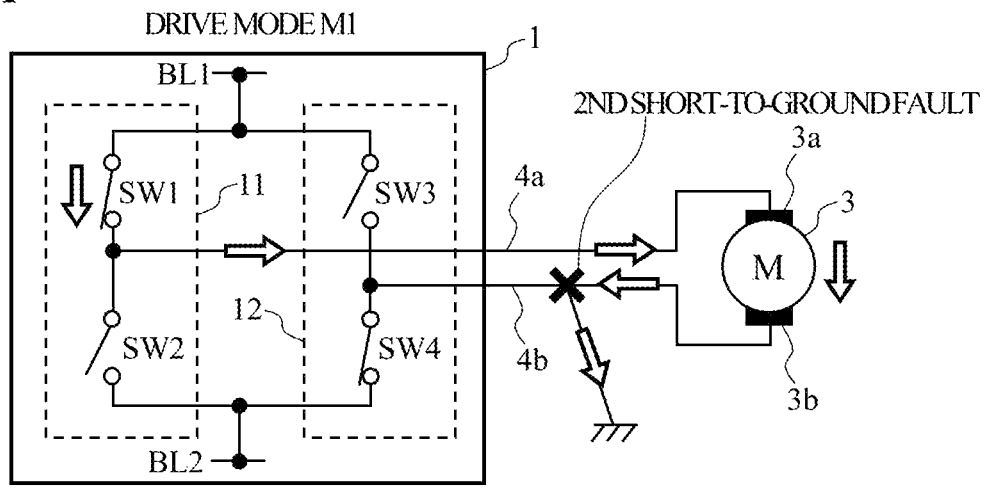
FIGS. 6A to 6C are schematic views each showing a current path created upon a second short-to-ground fault.
Figure 6B:
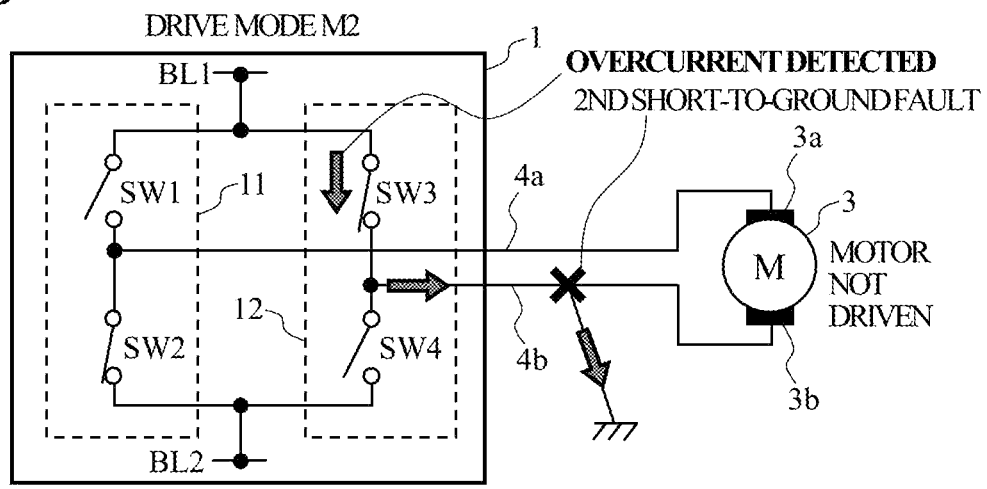
Figure 6C:
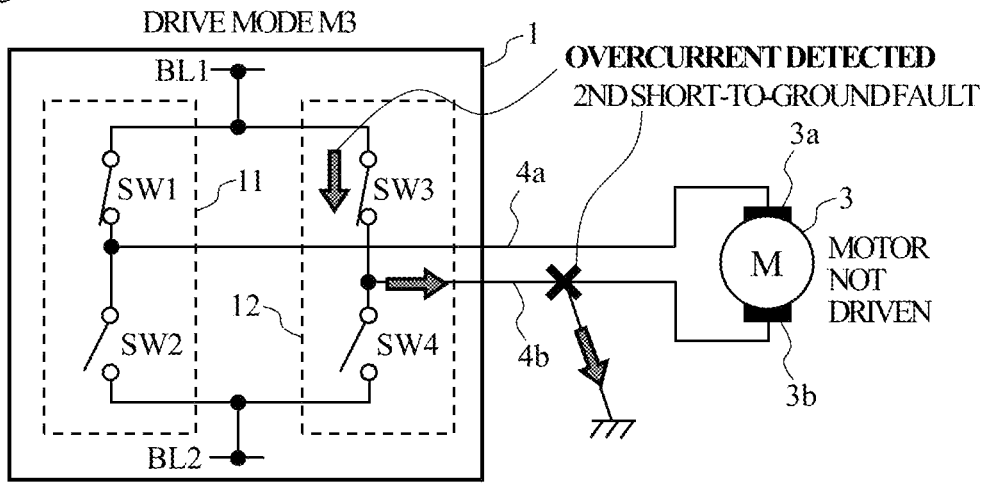
Figure 7:
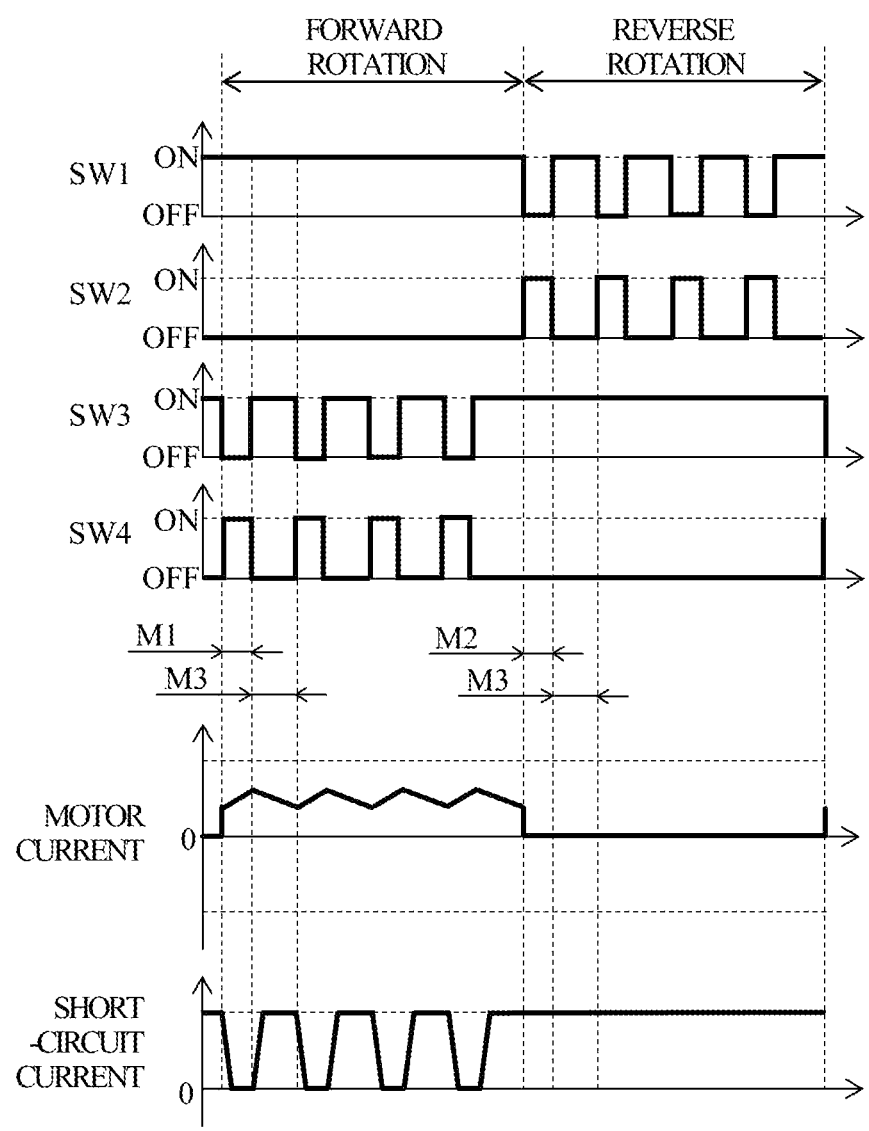
FIG. 7 is a timing chart schematically illustrating temporal changes of currents observed upon the second short-to-ground fault.

FIGS. 6A to 6C each show a current path created when the second short-to-ground fault has occurred. FIG. 7 shows temporal changes of the motor current and the short-circuit current observed when the second short-to-ground fault has occurred. As used herein, the second short-to-ground fault refers to a relatively low impedance electrical connection that accidentally occurs between the ground and electric harness 4b in the motor power supply line. Note that the second short-to-ground fault may occur also in other line segments of the motor power supply line; that is, in the line segment between second IPD 12 and output terminal 1b or in the line segment between motor terminal 3b and the other brush. However, in the following description, electric harness 4b will be used as a representative location at which the second short-to-ground fault occurs. The same applies to the second short-to-supply fault, which will be described later.

In the drive mode M1 shown in FIG. 6A, when the second short-to-ground fault has occurred, a current supplied from in-vehicle battery B flows sequentially through positive feed line BL1, semiconductor switch SW1, motor 3 (from motor terminal 3a to motor terminal 3b) and electric harness 4b, and flows from the short-to-ground location of electric harness 4b to the ground. Thus, as shown in FIG. 7, a positive motor current flows through motor 3 so as to rotationally drive motor 3 in the forward direction and there is thus no short-circuit current flowing from the positive electrode of in-vehicle battery B to the ground.

In the drive mode M2 shown in FIG. 6B and the drive mode M3 shown in FIG. 6C, when the second short-to-ground fault has occurred, a current supplied from in-vehicle battery B flows sequentially through positive feed line BL1, semiconductor switch SW3, and electric harness 4b, and flows from the short-to-ground location of electric harness 4b directly to the ground. Thus, as shown in FIG. 7, in the drive mode M2 and in the drive mode M3 that is switched from the drive mode M2, the motor current is substantially zero and motor 3 is not driven. In the drive mode M3 that is switched from the drive mode M1, the motor current flows due to the back electromotive voltage in motor 3. However, the current from in-vehicle battery B does not flow through motor 3 due to the back electromotive voltage in motor 3 and does not contribute to the drive of motor 3. Accordingly, in the drive modes M2, M3, when the second short-to-ground fault has occurred, a short-circuit current from the positive electrode of in-vehicle battery B to the ground flows through second IPD 12. In this case, overcurrent monitoring unit 12b detects the short-circuit current as an overcurrent and outputs the overcurrent detection signal IS2.

First Short-to-Supply Fault

Figure 8A:
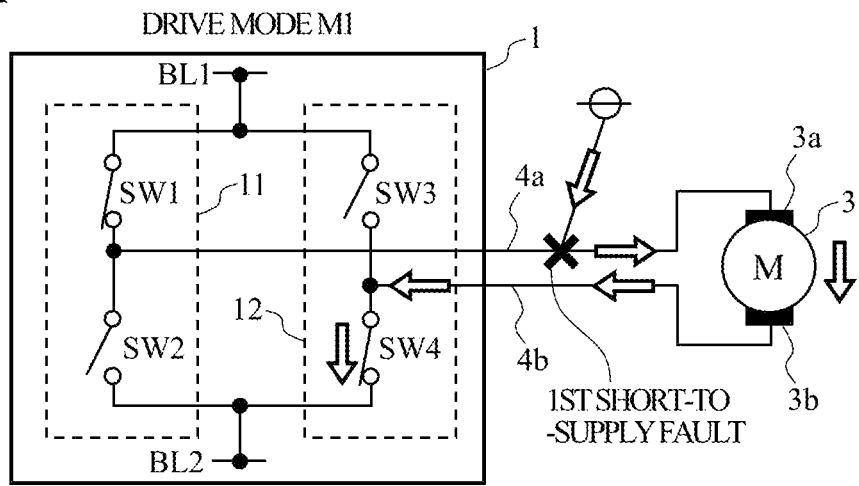
FIGS. 8A to 8C are schematic views each showing a current path created upon a first short-to-supply fault.
Figure 8B:
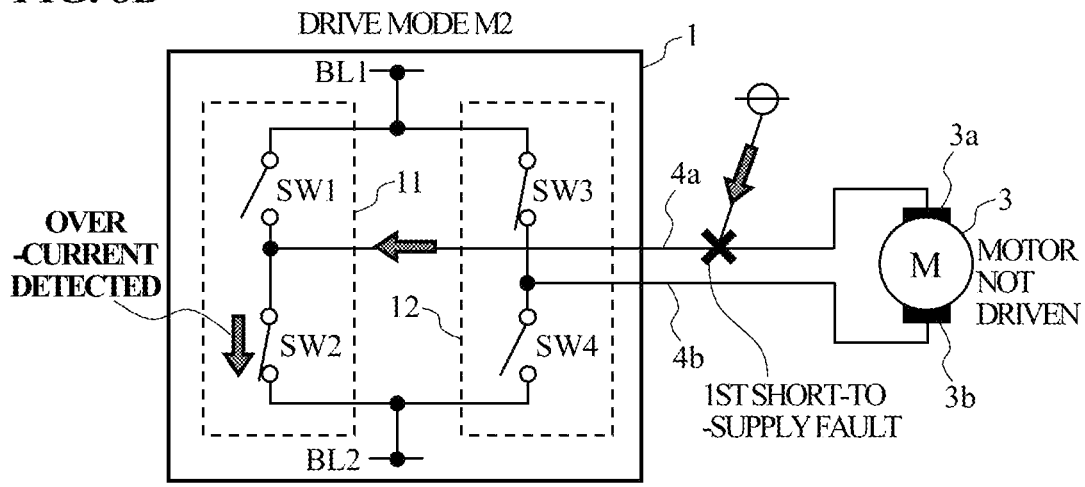
Figure 8C:
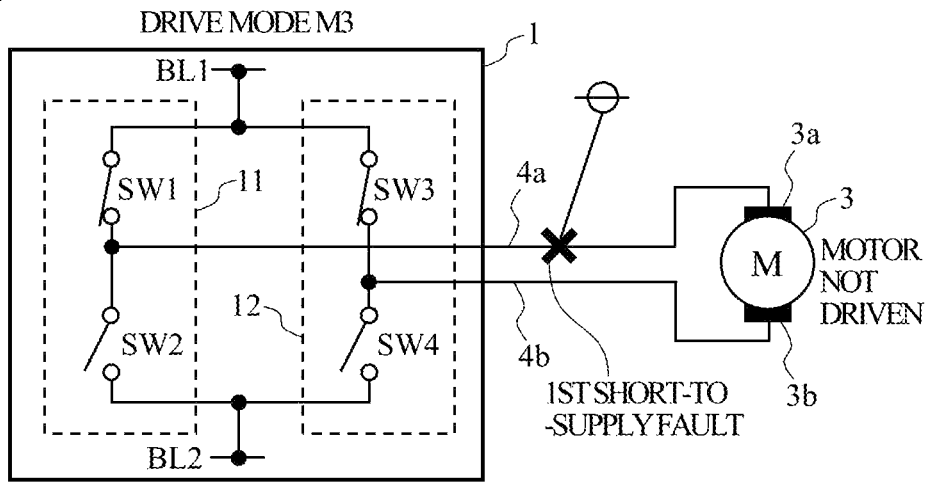

FIGS. 8A to 8C each show a current path created when the first short-to-supply fault has occurred. FIG. 9 shows temporal changes of the motor current and the short-circuit current observed when the first short-to-supply fault has occurred. As used herein, the first short-to-supply fault refers to a relatively low impedance electrical connection that accidentally occurs between in-vehicle battery B and electric harness 4a in the motor power supply line. In the drive mode M1 shown in FIG. 8A, when the first short-to-supply fault has occurred, a current supplied from in-vehicle battery B enters electric harness 4a from the short-to-supply location of electric harness 4a. Then, the current flows sequentially through motor 3 (from motor terminal 3a to motor terminal 3b), semiconductor switch SW4, and negative feed line BL2. Thus, as shown in FIG. 9, a positive motor current flows through motor 3 so as to rotationally drive motor 3 in the forward direction and there is thus no short-circuit current flowing from the positive electrode of in-vehicle battery B to the ground.

In the drive mode M2 shown in FIG. 8B, when the first short-to-supply fault has occurred, a current supplied from in-vehicle battery B enters electric harness 4a from the short-to-supply location of electric harness 4a, and then flows sequentially through semiconductor switch SW2 and negative feed line BL2. Thus, motor terminal 3a and motor terminal 3b have substantially the same potential, so that the motor current is substantially zero and motor 3 is not driven in the drive mode M2, as shown in FIG. 9. Accordingly, a short-circuit current from the positive electrode of in-vehicle battery B to the ground flows through first IPD 11. In this case, overcurrent monitoring unit 11b detects the short-circuit current as an overcurrent and outputs the overcurrent detection signal IS1.

In the drive mode M3 shown in FIG. 8C, semiconductor switch SW2 and semiconductor switch SW4 are both turned off. Thus, in the drive mode M3 that is switched from the drive mode M1, when the first short-to-supply fault has occurred, the motor current caused by the back electromotive voltage in motor 3 recirculates through motor 3 but the current supplied from in-vehicle battery B does not flow to negative feed line BL2. That is, as shown in FIG. 9, there is no short-circuit current flowing from the positive electrode of in-vehicle battery B to the ground in the drive mode M3.

Second Short-to-Supply Fault

Figure 10A:
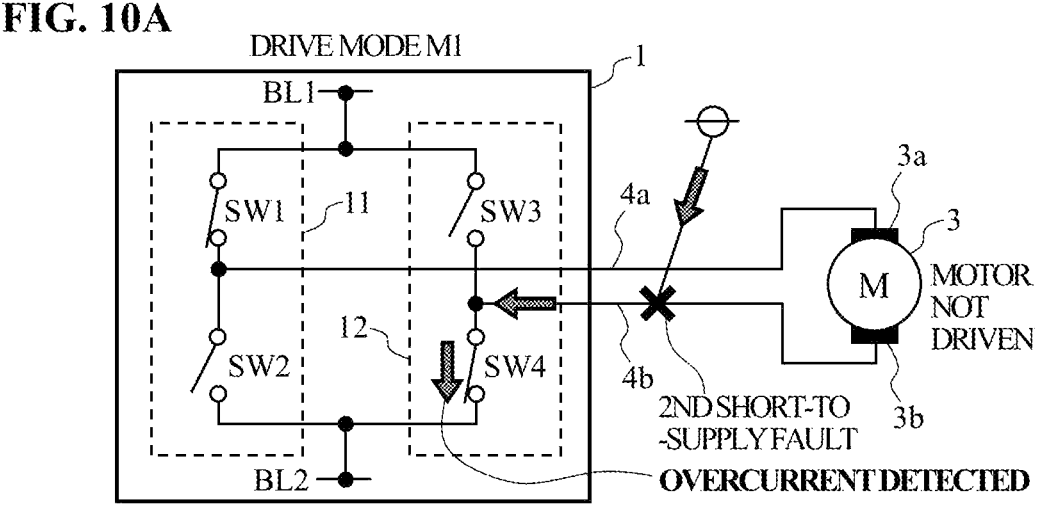
FIGS. 10A to 10C are schematic views each showing a current path created upon a second short-to-supply fault.
Figure 10B:
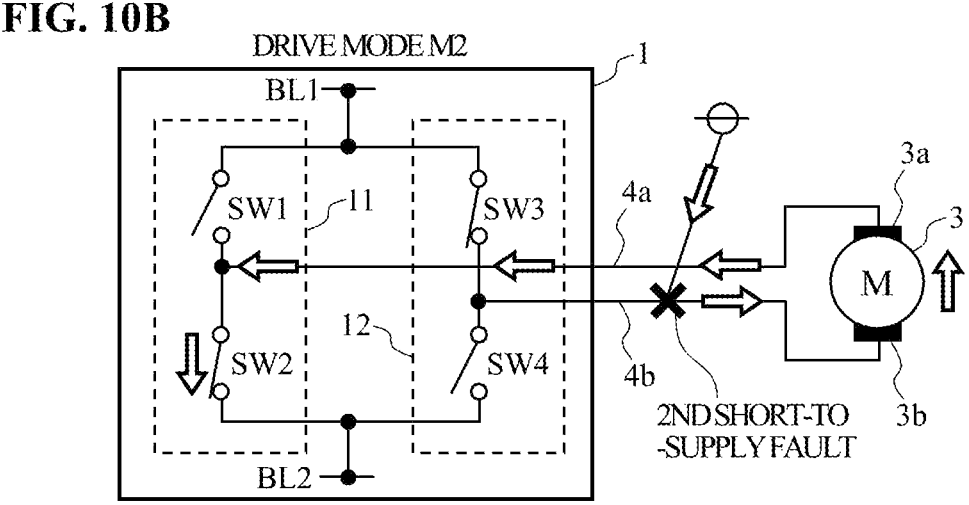
Figure 10C:
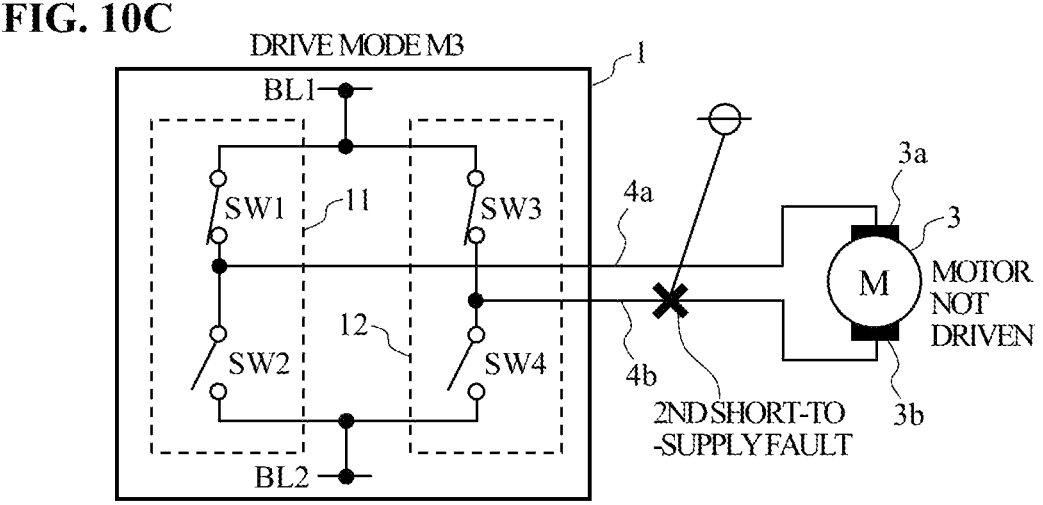
Figure 11:
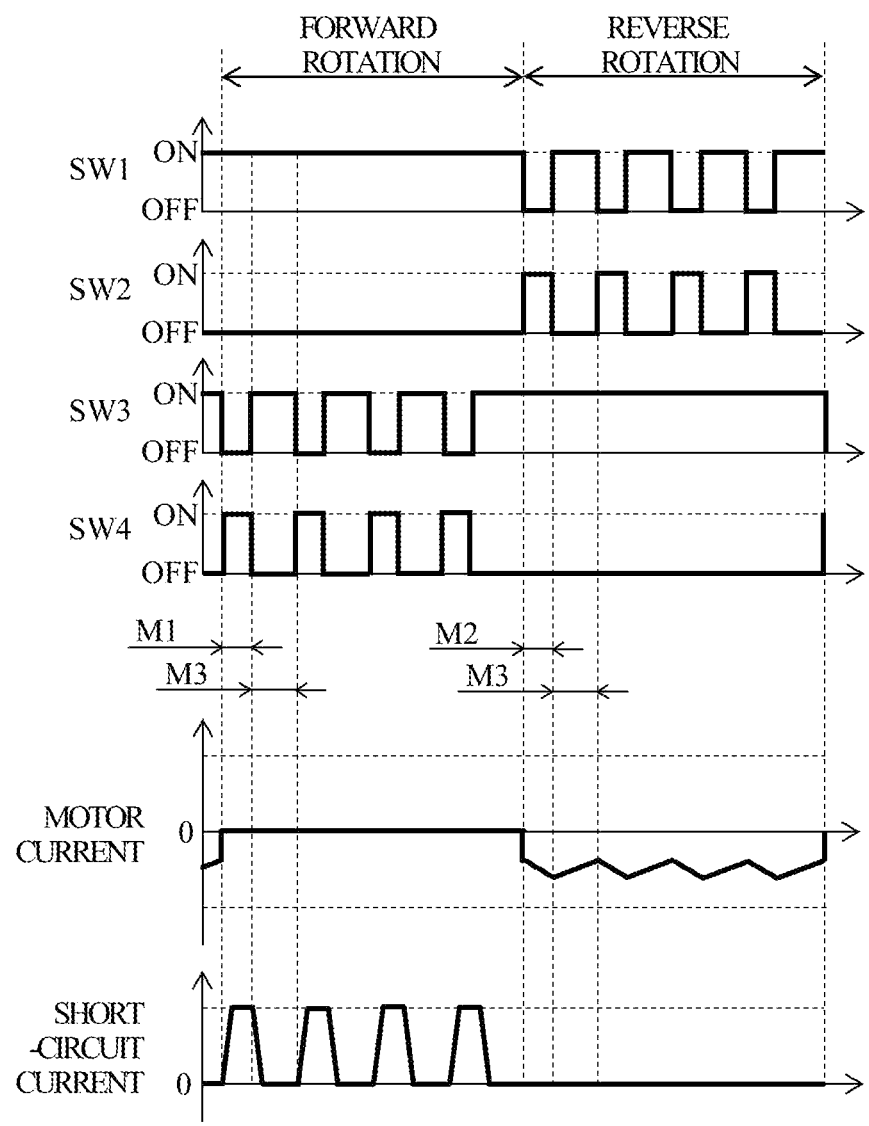
FIG. 11 is a timing chart schematically illustrating temporal changes of currents observed upon the second short-to-supply fault.

FIGS. 10A to 10C each show a current path created when the second short-to-supply fault has occurred. FIG. 11 shows temporal changes of the motor current and the short-circuit current observed when the second short-to-supply fault has occurred. As used herein, the second short-to-supply fault refers to a relatively low impedance electrical connection that accidentally occurs between in-vehicle battery B and electric harness 4b in the motor power supply line. In the drive mode M1 shown in FIG. 10A, when the second short-to-supply fault has occurred, a current supplied from in-vehicle battery B enters electric harness 4b from the short-to-supply location of electric harness 4b, and then flows sequentially through semiconductor switch SW4 and negative feed line BL2. Thus, motor terminal 3a and motor terminal 3b have substantially the same potential, so that the motor current is substantially zero and motor 3 is not driven in the drive mode M1, as shown in FIG. 11. Accordingly, a short-circuit current from the positive electrode of in-vehicle battery B to the ground flows through second IPD 12. In this case, overcurrent monitoring unit 12b detects the short-circuit current as an overcurrent and outputs the overcurrent detection signal IS2.

In the drive mode M2 shown in FIG. 10B, when the second short-to-supply fault has occurred, a current supplied from in-vehicle battery B enters electric harness 4b from the short-to-supply location of electric harness 4b, and then flows through motor 3 from motor terminal 3b to motor terminal 3a. After that, the current flow sequentially through semiconductor switch SW2 and negative feed line BL2. Thus, as shown in FIG. 11, a negative motor current flows through motor 3 so as to rotationally drive motor 3 in the reverse direction and there is thus no short-circuit current flowing from the positive electrode of in-vehicle battery B to the ground.

In the drive mode M3 shown in FIG. 10C, semiconductor switch SW2 and semiconductor switch SW4 are both turned off. Thus, in the drive mode M3 that is switched from the drive mode M2, when the second short-to-supply fault has occurred, the motor current caused by the back electromotive voltage in motor 3 recirculates through motor 3 but the current supplied from in-vehicle battery B does not flow to negative feed line BL2. That is, as shown in FIG. 11, there is no short-circuit current flowing from the positive electrode of in-vehicle battery B to the ground in the drive mode M3.

Diagnostic Processing on Motor Power Supply Line

Figure 12:
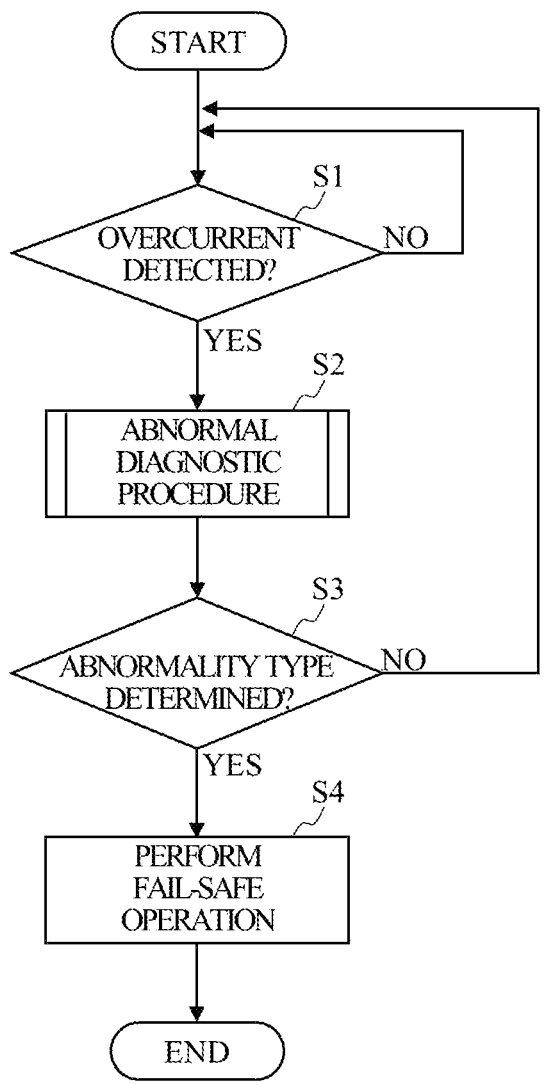
FIG. 12 is a flowchart showing a main routine of diagnostic processing.

FIG. 12 shows an example of a main routine of the diagnostic processing on the motor power supply line, which is performed by CPU 16 when the ignition switch IGN is turned on and the power supply to CPU 16 is started.

In step S1 (abbreviated as "S1" in FIG. 12; the same applies to the other steps below), CPU 16 determines whether an overcurrent is detected in first IPD 11 or second IPD 12 based on the overcurrent detection signals IS1, IS2. When CPU 16 determines that an overcurrent is detected (YES), the operation proceeds to step S2. When CPU 16 determines that no overcurrent is detected (NO), step S1 is repeated.

In step S2, CPU 16 interrupts the drive control processing on motor 3 and performs abnormality diagnostic procedure on the motor power supply line. The abnormality diagnostic procedure on the motor power supply line allows detecting and determining whether and what type of an abnormality has occurred in the motor power supply line. As described above, abnormalities in the motor power supply line are classified into types including a first short-to-ground fault, a second short-to-ground fault, a first short-to-supply fault, and a second short-to-supply fault. The abnormality diagnostic procedure will be described in more detail later.

In step S3, when the type of the abnormality in the motor power supply line has been determined as a result of the abnormality diagnostic procedure of step S2 (YES), the operation proceeds to step S4. When the type of the abnormality in the motor power supply line has not been determined (NO), CPU 16 resumes the drive control processing on motor 3 and the operation returns to step S1.

In step S4, CPU 16 carries out control for causing fail-safe operation of motor 3. The fail-safe operation may include stopping the operation of motor 3 or restricting the rotation of motor 3 in an available direction.

To stop the operation of motor 3, CPU 16 outputs the control signal SIG for turning off semiconductor relay 13 to semiconductor relay 13. Additionally or alternatively, CPU 16 may output, to first IPD 11 and second IPD 12, the output limiting signal INH for forcibly turning off semiconductor switches SW1-SW4.

To restrict the rotation of motor 3 in an available direction, CPU 16 performs as follows. When determining that the type of abnormality in the motor power supply line is the first short-to-ground fault or the second short-to-supply fault, CPU 16 rotationally drives motor 3 in the reverse direction. Specifically, CPU 16 outputs the pulse width modulation signals PWM1, PWM2 so that the on-off combination setting of semiconductor switches SW1-SW4 is maintained at the drive mode M2 or repeatedly switched between the drive mode M2 and the drive mode M3. On the other hand, when determining that the type of abnormality in the motor power supply line is the second short-to-ground fault or the first short-to-supply fault, CPU 16 rotationally drives motor 3 in the forward direction. Specifically, CPU 16 outputs the pulse width modulation signals PWM1, PWM2 so that the on-off combination setting of semiconductor switches SW1-SW4 is maintained at the drive mode M1 or repeatedly switched between the drive mode M1 and the drive mode M3.

Furthermore, in restricting the rotation of motor 3 in an available direction, CPU 16 may drive motor 3 so as to optionally or forcibly make the actual VTC angle equal to a target VTC angle that is previously specified for the fail-safe operation in case of an abnormally. This allows changing the actual VTC angle to a VTC angle that is advantageous for fail-safety of the internal combustion engine to improve the limp home performance.

When CPU 16 performs the fail-safe operation by restricting the rotation of motor 3 in an available direction after determining the type of abnormality in the motor power supply line, an additional abnormality may occur during the fail-safe operation. In this case, CPU 16 may stop the operation of motor 3. For example, when an overcurrent is detected based on the overcurrent detection signal IS1 or IS2 during the fail-safe operation, CPU 16 may stop the operation of motor 3.

Abnormality Diagnostic Procedure
Method for Detecting Abnormality

Figure 13:
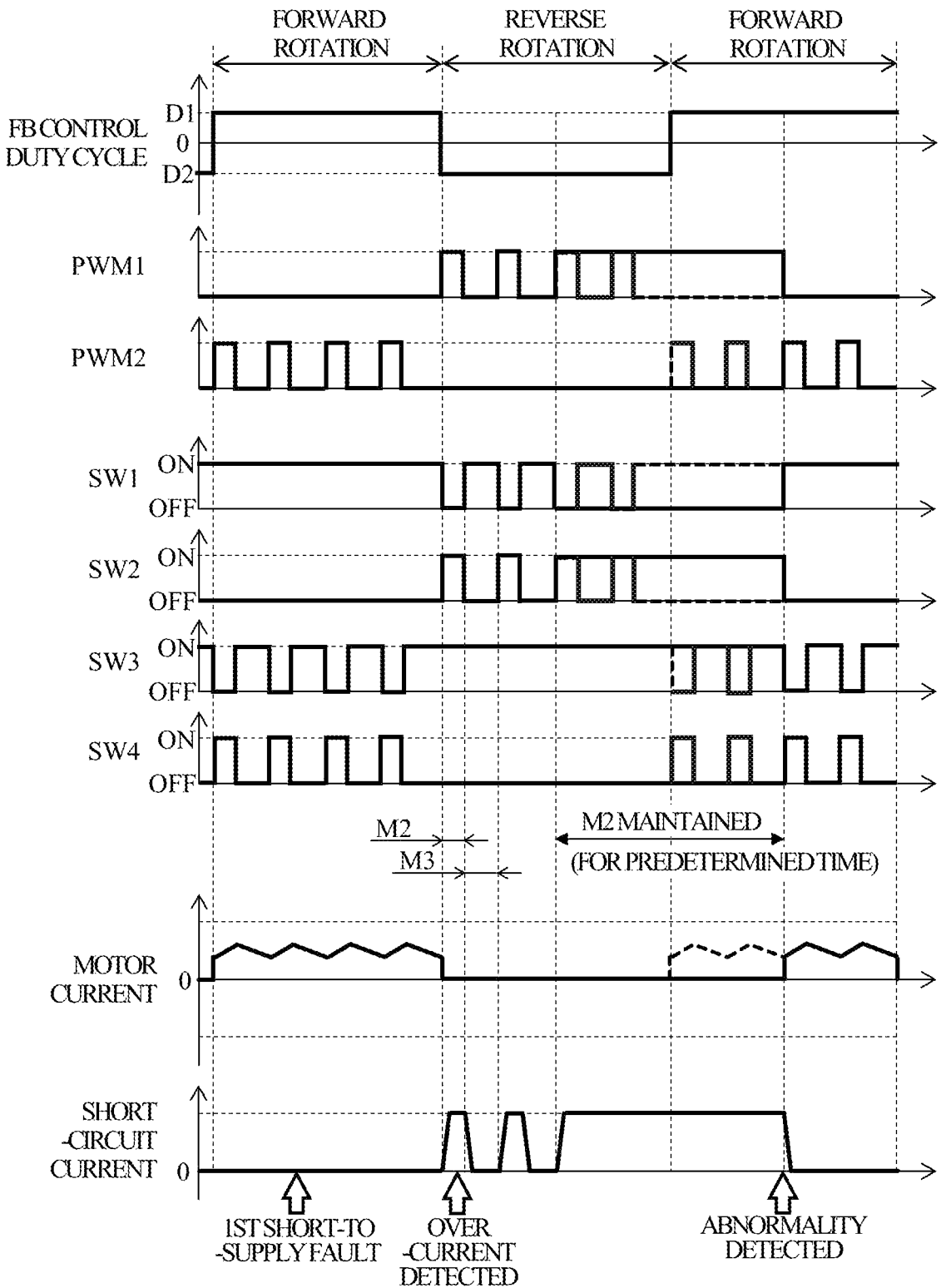
FIG. 13 is a timing chart for illustrating a method for detecting an abnormality.

FIG. 13 is a timing chart for illustrating a method for detecting an abnormality. In FIG. 13, it is assumed as an example that the first short-to-supply fault occurs while motor 3 is rotationally driven in the forward direction. When CPU 16 rotationally drives motor 3 in the forward direction, no short-circuit current flows as described above (see FIG. 8A). Then, when CPU 16 calculates the FB control duty cycle as the negative value D2 [%] and switches the on-off combination setting of semiconductor switches SW1-SW4 to the drive mode M2 to rotationally drive motor 3 in the reverse direction, a short-circuit current flows (see FIG. 8B). In response, overcurrent monitoring unit 11b in first IPD 11 detects this short-circuit current as an overcurrent and outputs the overcurrent detection signal IS1.

However, while the FB control duty cycle is set to the negative value D2 [%], the on-off combination setting of semiconductor switches SW1-SW4 is rapidly and repeatedly switched between the drive mode M2 and the drive mode M3 in response to the pulse width modulation signal PWM1 and no short-circuit current flows in the on-off combination setting corresponding to the drive mode M3. Thus, while motor 3 is rotationally driven in the reverse direction, a short-circuit current flows only intermittently. Here, it may be assumed that CPU 16 can be configured to definitively determine the occurrence of a short-circuit current only when an overcurrent is detected for a predetermined number of consecutive times at each of which the on-off combination setting is set corresponding to the drive mode M2. However, such determination of short-circuit current flow may be difficult when motor 3 rapidly and repeatedly switches between forward and reverse rotations. In other words, it may be difficult to identify whether an overcurrent detected when semiconductor switches SW1-SW4 are set to the on-off combination setting corresponding to the drive mode M2 is a mere electrical noise or a short-circuit current due to an abnormality in the motor power supply line.

Therefore, when CPU 16 detects an overcurrent, CPU 16 outputs the pulse width modulation signals PWM1, PWM2 having duty cycles forcibly specified regardless of the calculated value of the FB control duty cycle in the abnormality diagnostic procedure on the motor power supply line. Specifically, CPU 16 outputs the pulse width modulation signals PWM1, PWM2 so that semiconductor switches SW1-SW4 are forcibly maintained at the on-off combination settings corresponding respectively to at least two selected ones of the drive modes M1-M3 one after another in a manner that each on-off combination setting is maintained for a predetermine time. For example, in FIG. 13, when detecting an overcurrent, CPU 16 maintains the drive mode M2 first. Here, an appropriate on-off combination setting of semiconductor switches SW1-SW4 allows continuous flow of a short-circuit current when an abnormality has occurred in the motor power supply line and thus, felicitates determining whether the detected overcurrent is a short-circuit current due to an abnormality in the motor power supply line. Each time semiconductor switches SW1-SW4 have been maintained at the on-off combination setting corresponding to the selected drive mode for the predetermined time, CPU 16 detects and determines whether and what type of an abnormality has occurred in the motor power supply line based on a location (first IPD 11 or second IPD 12) where the overcurrent is detected. For example, as shown in FIG. 13, when an overcurrent is detected in first IPD 11 when semiconductor switches SW1-SW4 are forcibly maintained at the on-off combination setting corresponding to the drive mode M2 (see FIG. 8B), CPU 16 can detect the occurrence of the first short-to-supply fault. In FIG. 13, each thick dashed line in the temporal changes of the pulse width modulation signals PWM1, PWM2 and the temporal changes of the on and off of semiconductor switches SW1-SW4 indicates temporal changes observed when the drive control processing is performed on motor 3 based on the FB control duty cycle.

First Example of Abnormality Diagnostic Procedure

Figure 14:
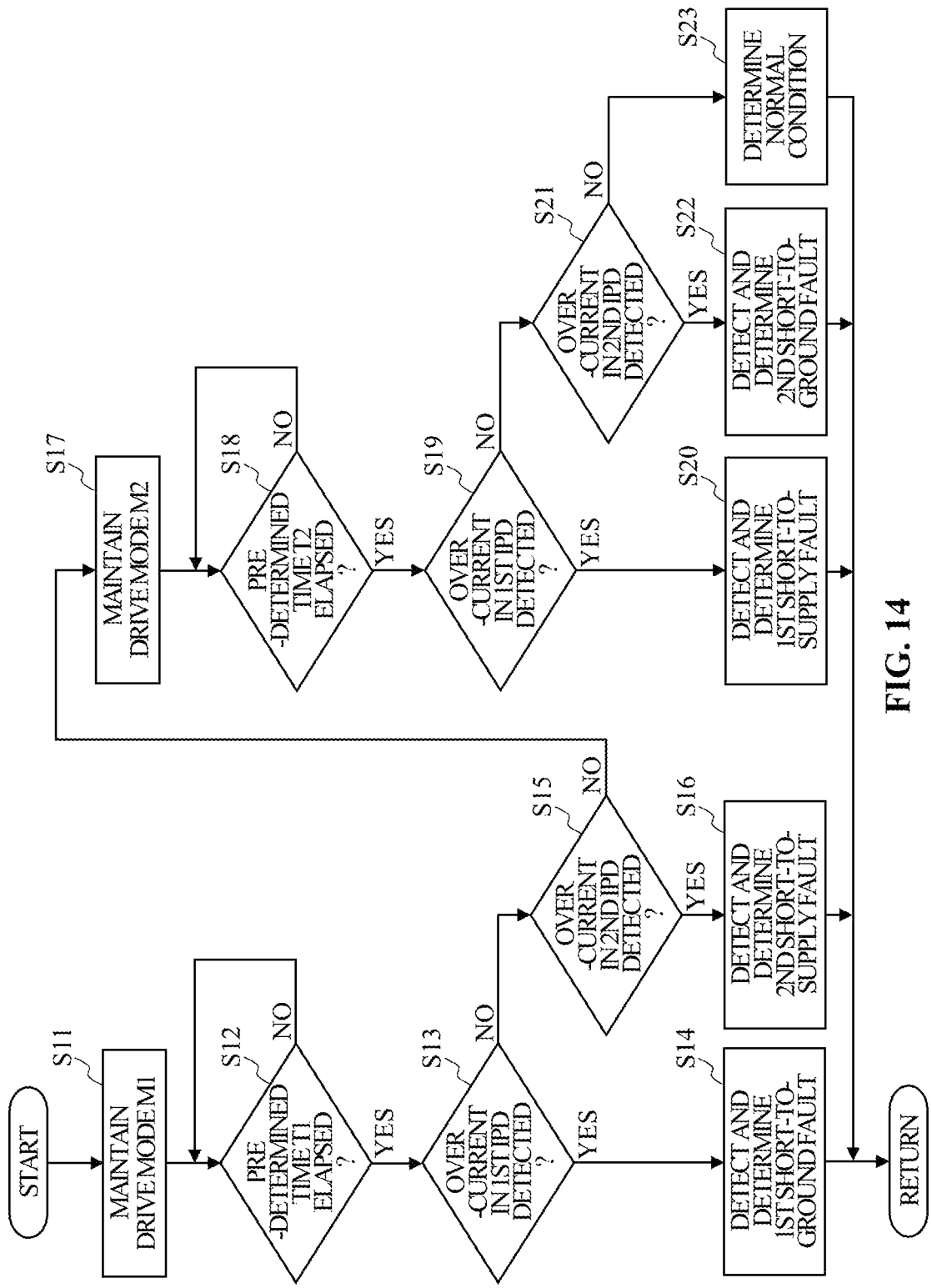
FIG. 14 is a flowchart showing a first example of an abnormality diagnostic subroutine.

FIG. 14 shows a first example of a subroutine for the abnormality diagnostic procedure on the motor power supply line performed in step S2 of FIG. 12.

In step S11, CPU 16 outputs, to first IPD 11 and second IPD 12, the pulse width modulation signals PWM1, PWM2 for forcibly maintaining semiconductor switches SW1-SW4 at the on-off combination setting corresponding to the drive mode M1. When CPU 16 is configured to be able to specify what drive mode is used when an overcurrent is detected in step S1 described above, CPU 16 may first maintain semiconductor switches SW1-SW4 at the on-off combination setting corresponding to the drive mode that is used when the overcurrent is detected. This allows for relatively early detection and determination of what type of abnormality has occurred in the motor power supply line.

In step S12, CPU 16 determines whether or not semiconductor switches SW1-SW4 has been forcibly maintained at the on-off combination setting corresponding to the drive mode M1 for a predetermined time T1. The predetermined time T1 is a duration for which semiconductor switches SW1-SW4 are forcibly maintained in the drive mode M1 and which is long enough to allow reliably determining the occurrence of a short-circuit current when the first short-to-ground fault or the second short-to-supply fault has occurred in the motor power supply line. Preferably, the predetermined time T1 may be less than an interval from when motor 3 starts to be driven to when the camshaft actually starts advancing or retarding with respect to the crankshaft. When CPU 16 determines that the predetermined time T1 has elapsed (YES), the operation proceeds to step S13. On the other hand, when CPU 16 determines that the predetermined time T1 has not yet elapsed (NO), step S12 is repeated.

In step S13, CPU 16 determines whether or not an overcurrent is detected in first IPD 11 based on the overcurrent detection signal IS1. When CPU 16 determines that an overcurrent is detected in first IPD 11 (YES), the operation proceeds to step S14. On the other hand, when CPU 16 determines that no overcurrent is detected in first IPD 11 (NO), the operation proceeds to step S15.

In step S14, CPU 16 detects that the first short-to-ground fault has occurred in electric harness 4a (see FIG. 4A), and makes the abnormality diagnosis that determines the detected type of abnormality has occurred. Then, the subroutine ends.

In step S15, CPU 16 determines whether or not an overcurrent is detected in second IPD 12 based on the overcurrent detection signal IS2. When CPU 16 determines that an overcurrent is detected in second IPD 12 (YES), the operation proceeds to step S16. On the other hand, when CPU 16 determines that no overcurrent is detected in second IPD 12 (NO), the operation proceeds to step S17.

In step S16, CPU 16 detects that the second short-to-supply fault has occurred in electric harness 4b (see FIG. 10A), and makes the abnormality diagnosis that determines the occurrence of the detected type of abnormality. Then, the subroutine ends.

The present invention is not limited to the procedure in which the overcurrent detection determination for first IPD 11 and the overcurrent detection determination for second IPD 12 are carried out in this order. Alternatively, the overcurrent detection determination for second IPD 12 may be carried out first, and then the overcurrent detection determination for first IPD 11 may be carried out. The same applies to other overcurrent detection determinations each carried out when a selected drive mode is maintained for a predetermined time, which will be described below.

In step S17, CPU 16 outputs the pulse width modulation signals PWM1, PWM2 for forcibly maintaining semiconductor switches SW1-SW4 at the on-off combination setting corresponding to the drive mode M2.

In step S18, CPU 16 determines whether or not semiconductor switches SW1-SW4 has been forcibly maintained at the on-off combination setting corresponding to the drive mode M2 for a predetermined time T2. The predetermined time T2 is a duration for which semiconductor switches SW1-SW4 are maintained at the on-off combination setting corresponding to the drive mode M2 and which is long enough to allow reliably determining the occurrence of a short-circuit current when the second short-to-ground fault has occurred in electric harness 4b or the first short-to-supply fault has occurred in electric harness 4a. Preferably, the predetermined time T2 may be less than an interval from when motor 3 starts to be driven to when the camshaft actually starts advancing or retarding with respect to the crankshaft. The predetermined time T2 may have a duration equal to that of the predetermined time T1. When CPU 16 determines that the predetermined time T2 has elapsed (YES), the operation proceeds to step S19. On the other hand, when CPU 16 determines that the predetermined time T2 has not yet elapsed (NO), step S18 is repeated.

In step S19, CPU 16 determines whether or not an overcurrent is detected in first IPD 11 based on the overcurrent detection signal IS1. When CPU 16 determines that an overcurrent is detected in first IPD 11 (YES), the operation proceeds to step S20. On the other hand, when CPU 16 determines that no overcurrent is detected in first IPD 11 (NO), the operation proceeds to step S21.

In step S20, CPU 16 detects that the first short-to-supply fault has occurred in electric harness 4a (see FIG. 8B), and makes the abnormality diagnosis that determines the occurrence of the detected type of abnormality. Then, the subroutine ends.

In step S21, CPU 16 determines whether or not an overcurrent is detected in second IPD 12 based on the overcurrent detection signal IS2. When CPU 16 determines that an overcurrent is detected in second IPD 12 (YES), the operation proceeds to step S22. On the other hand, when CPU 16 determines that no overcurrent is detected in second IPD 12 (NO) in step S21, the operation proceeds to step S23. In step S23, CPU 16 makes the abnormality diagnosis that determines the motor power supply line is in a normal condition. Then, the subroutine ends.

In step S22, CPU 16 detects that the second short-to-ground fault has occurred in electric harness 4b (see FIG. 6B), and makes the abnormality diagnosis that determines the occurrence of the detected type of abnormality. Then, the subroutine ends.

In the first example of the subroutine for the abnormality diagnostic procedure on the motor power supply line, an alternative procedure may be employed when an overcurrent is detected during the drive mode M2. Specifically, in this case, CPU 16 may first determine whether an overcurrent is detected when semiconductor switches SW1-SW4 are maintained at the on-off combination setting corresponding to the drive mode M2 for the predetermined time T2 and then determine whether an overcurrent is detected when semiconductor switches SW1-SW4 are maintained at the on-off combination setting corresponding to the drive mode M1 for the predetermined time T1.

According to the first example of the abnormality diagnostic procedure, CPU 16 can detect whether and which of the first short-to-ground fault and the second short-to-supply fault has occurred in the motor power supply line by forcibly maintaining semiconductor switches SW1-SW4 at the on-off combination setting corresponding to the drive mode M1. In addition, CPU 16 can detect whether and which of the first short-to-supply fault and the second short-to-ground fault has occurred in the motor power supply line by forcibly maintaining semiconductor switches SW1-SW4 at the on-off combination setting corresponding to the drive mode M2. The above can be summarized as: CPU 16 can diagnose which of the four types of abnormality has occurred in the motor power supply line by forcibly maintaining semiconductor switches SW1-SW4 at the on-off combination settings corresponding to a relatively small number of different drive modes (two drive modes, specifically) one after another in a manner that each on-off combination setting is maintained for a predetermine time.

Also, it is expected that, even if motor 3 may be slightly rotated in the forward direction by forcibly maintaining semiconductor switches SW1-SW4 at the on-off combination setting corresponding to the drive mode M1, motor 3 may be then slightly rotated in the reverse direction by forcibly maintaining semiconductor switches SW1-SW4 at the on-off combination setting corresponding to the drive mode M2. Thus, the resultant rotational position of motor 3 may be unchanged or little changed from before semiconductor switches SW1-SW4 are maintained at the on-off combination setting corresponding to the drive mode M1.

Second Example of Abnormality Diagnostic Procedure

Figure 15:
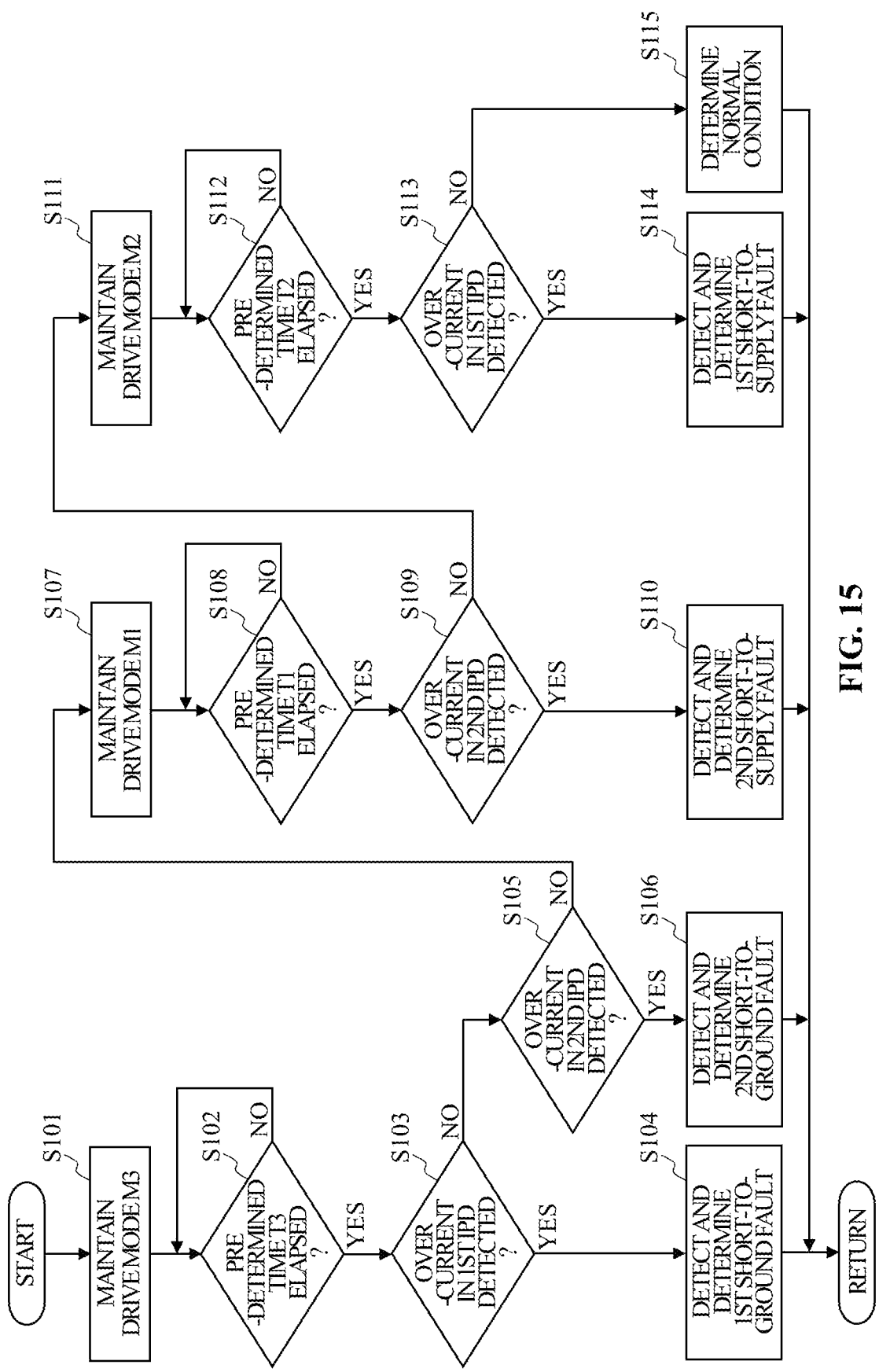
FIG. 15 is a flowchart showing a second example of the abnormality diagnostic subroutine.

FIG. 15 shows a second example of the subroutine for the abnormality diagnostic procedure on the motor power supply line performed in step S2 of FIG. 12.

In step S101, CPU 16 outputs, to first IPD 11 and second IPD 12, the pulse width modulation signals PWM1, PWM2 for forcibly maintaining semiconductor switches SW1-SW4 at the on-off combination setting corresponding to the drive mode M3. As shown in FIGS. 4C and 6C, forcibly maintaining semiconductor switches SW1-SW4 at the on-off combination setting corresponding to the drive mode M3 allows detecting an abnormality due to the first short-to-ground fault and an abnormality due to the second short-to-ground fault. Here, since the first and second short-to-ground faults tend to occur more frequently than the first and second short-to-supply faults, there may be a demand to diagnose earlier whether or not either of the first and second short-to-ground faults has occurred. To satisfy this demand, semiconductor switches SW1-SW4 may be forcibly maintained in the drive mode M3 first, as in this example.

In step S102, CPU 16 determines whether or not semiconductor switches SW1-SW4 has been forcibly maintained at the on-off combination setting corresponding to the drive mode M3 for a predetermined time T3. The predetermined time T3 is a duration for which semiconductor switches SW1-SW4 are forcibly maintained in the drive mode M3 and which is long enough to allow reliably determining the occurrence of a short-circuit current when the first short-to-ground fault or the second short-to-ground fault has occurred in the motor power supply line. The predetermined time T3 may have a duration substantially equal to those of the predetermined times T1, T2. Alternatively, considering that motor 3 is not driven in the drive mode M3, the predetermined time T3 may be longer than the predetermined times T1, T2 by leaving out of account an interval from when motor 3 starts to be driven to when the camshaft actually starts advancing or retarding with respect to the crankshaft. When CPU 16 determines that the predetermined time T3 has elapsed (YES), the operation proceeds to step S103. On the other hand, when CPU 16 determines that the predetermined time T3 has not yet elapsed (NO), step S102 is repeated.

When CPU 16 determines that an overcurrent is detected in first IPD 11 (YES) in step S103, the operation proceeds to step S104. On the other hand, when CPU 16 determines that no overcurrent is detected in first IPD 11 (NO) in step S103, the operation proceeds to step S105. In step S105, CPU 16 determines whether or not an overcurrent is detected in second IPD 12.

In step S104, CPU 16 detects that the first short-to-ground fault has occurred in electric harness 4a (see FIG. 4C), and makes the abnormality diagnosis that determines the occurrence of the detected type of abnormality. Then, the subroutine ends.

When CPU 16 determines that an overcurrent is detected in second IPD 12 (YES) in step S105, the operation proceeds to step S106. In step S106, CPU 16 detects that the second short-to-ground fault has occurred in electric harness 4b (see FIG. 6C), and makes the abnormality diagnosis that determines the occurrence of the detected type of abnormality. Then, the subroutine ends.

On the other hand, when CPU 16 determines that no overcurrent is detected in second IPD 12 (NO) in step S105, CPU 16 determines that there has not occurred any abnormality due to the first short-to-ground fault or the second short-to-ground fault and the operation proceeds to step S107. Then, CPU 16 diagnoses whether and which of the first short-to-supply fault or the second short-to-supply has occurred.

In steps S107 and S108, CPU 16 forcibly maintains semiconductor switches SW1-SW4 at the on-off combination setting corresponding to the drive mode M1 for the predetermined time T1. When the predetermined time T1 has elapsed, the operation proceeds to step S109, in which CPU 16 determines whether or not an overcurrent is detected in second IPD 12. When CPU 16 determines that an overcurrent is detected in second IPD 12 (YES) in step S109, the operation proceeds to step S110. In step S110, CPU 16 detects that the second short-to-supply fault has occurred in electric harness 4b (see FIG. 10A), and makes the abnormality diagnosis that determines the occurrence of the detected type of abnormality. Then, the subroutine ends.

Note that CPU 16 is designed intentionally not to determine whether an overcurrent is detected in first IPD 11 when the drive mode M1 is maintained for the predetermined time T1 in steps S107 and S108. This is because CPU 16 has already determined in step S103 that the occurrence of the first short-to-ground fault is not detected when semiconductor switches SW1-SW4 are forcibly maintained at the on-off combination setting corresponding to the drive mode M3 in step S101.

When CPU 16 determines that no overcurrent is detected in second IPD 12 (NO) in step S109, the operation proceeds to step S111. In steps S111 and S112, CPU 16 forcibly maintains semiconductor switches SW1-SW4 at the on-off combination setting corresponding to the drive mode M2 for the predetermined time T2. When the predetermined time T2 has elapsed, the operation proceeds to step S113, in which CPU 16 determines whether or not an overcurrent is detected in first IPD 11.

When CPU 16 determines that an overcurrent is detected in first IPD 11 (YES) in step S113, the operation proceeds to step S114. In step S114, CPU 16 detects that the first short-to-supply fault has occurred in electric harness 4a (see FIG. 8B), and makes the abnormality diagnosis that determines the occurrence of the detected type of abnormality. Then, the subroutine ends. On the other hand, when CPU 16 determines that no overcurrent is detected in first IPD 11 (NO) in step S113, the operation proceeds to step S115. In step S115, CPU 16 makes the abnormality diagnosis that determines the motor power supply line is in a normal condition. Then, the subroutine ends.

Note that CPU 16 is designed intentionally not to determine whether an overcurrent is detected in second IPD 12 when the drive mode M2 is maintained for the predetermined time T2 in steps S111 and S112. This is because CPU 16 has already determined in step S105 that the occurrence of the second short-to-ground fault is not detected when semiconductor switches SW1-SW4 are forcibly maintained at the on-off combination setting corresponding to the drive mode M3 in step S101.

In the second example of the subroutine for the abnormality diagnostic procedure on the motor power supply line, the set of steps S107 to S110 for maintaining the drive mode M1 and the set of steps S111 to S114 for maintaining the drive mode M2 may be carried out in the order opposite to the above.

According to the second example of the subroutine for the abnormality diagnostic procedure on the motor power supply line, CPU 16 first maintains semiconductor switches SW1-SW4 at the on-off combination setting corresponding to the drive mode M3. This allows CPU 16 to first detect whether or not there has occurred either of the first and second short-to-ground faults, which tend to occur relatively more frequently. Furthermore, even if CPU 16 does not detect the occurrence of the first short-to-ground fault or the second short-to-ground fault, CPU 16 can detect whether either of the first short-to-supply fault and the second short-to-supply fault has occurred by forcibly maintaining semiconductor switches SW1-SW4 at the on-off combination settings corresponding to the drive modes M1 and M2 one after another.

Third Example of Abnormality Diagnostic Procedure

Figure 16:
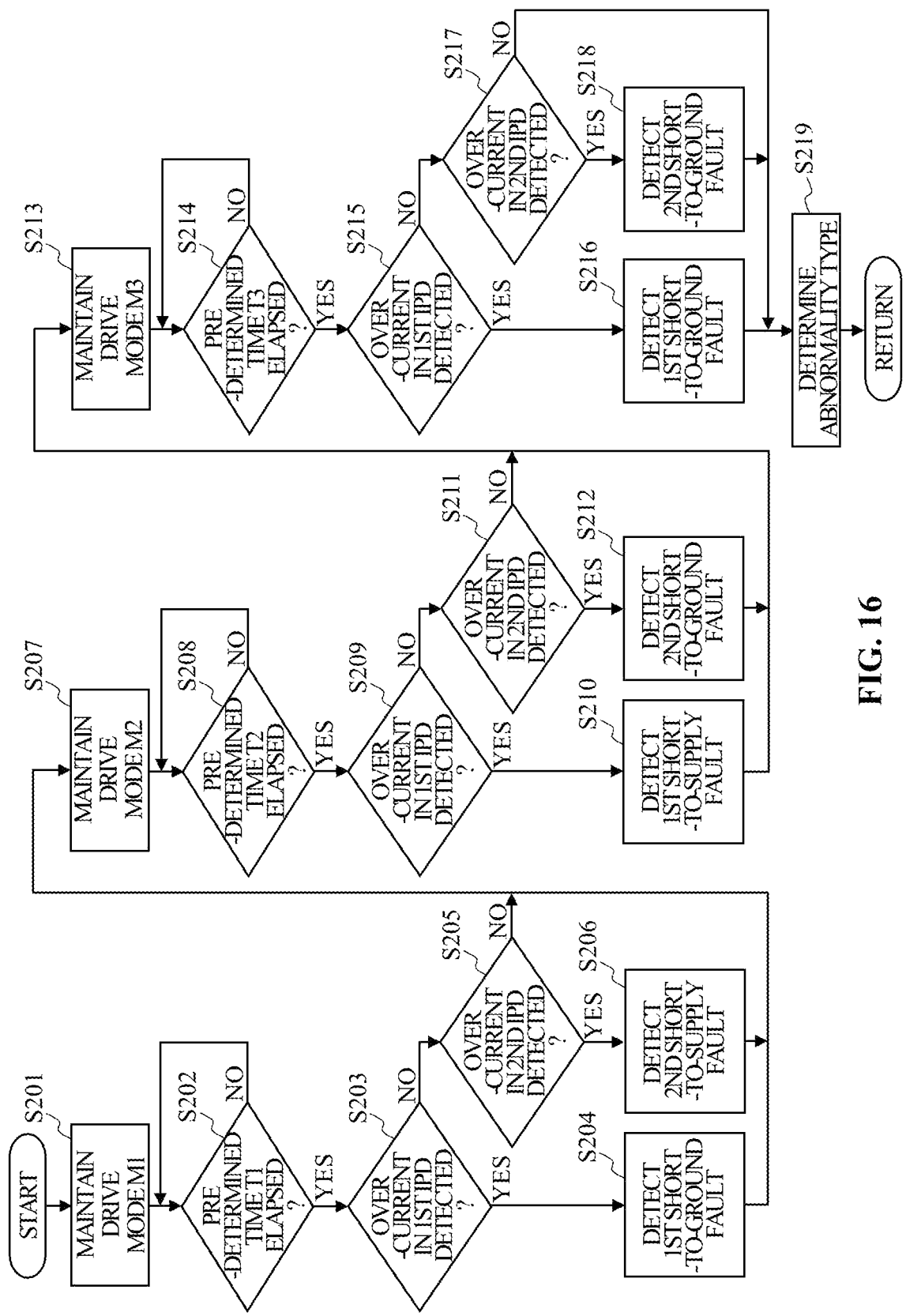
FIG. 16 is a flowchart showing a third example of the abnormality diagnostic subroutine.

FIG. 16 shows a third example of the subroutine for the abnormality diagnostic procedure on the motor power supply line performed in step S2 of FIG. 12.

The operations in steps S201 to S212 in this subroutine is the same as those in steps S11 to S22 in FIG. 14, and the operations in steps S213 to S218 in this subroutine is the same as those in steps S101 to S106 in FIG. 15. Therefore, detailed description for steps S201 to S212 and S213 to S218 will be omitted or simplified, except for the following differences.

In steps S201 and S202, CPU 16 forcibly maintains semiconductor switches SW1-SW4 at the on-off combination setting corresponding to the drive mode M1 for the predetermined time T1. Then, even if CPU 16 detects the occurrence of the first short-to-ground fault in step S204 or detects the occurrence of the second short-to-supply fault in step S206, CPU 16 does not immediately make the abnormality diagnosis that determines the occurrence of the detected type of abnormality, and the subroutine continues. Instead, CPU 16 temporarily stores the detection result of step S204 or S206 regarding the type of abnormality in a storage unit such as a random access memory (RAM). Then, the operation proceeds to step S207. When CPU 16 detects no overcurrent in second IPD 12 (NO) in step S205, CPU 16 temporarily stores the detection result indicating that neither the first short-to-ground fault nor the second short-to-supply fault has occurred, and the operation proceeds to step S207.

In steps S207 and S208, CPU 16 forcibly maintains semiconductor switches SW1-SW4 at the on-off combination setting corresponding to the drive mode M2 for the predetermined time T2. Then, even if CPU 16 detects the occurrence of the first short-to-supply fault in step S210 or detects the occurrence of the second short-to-ground fault in step S212, CPU 16 does not immediately make the abnormality diagnosis that determines the occurrence of the detected type of abnormality, and the subroutine continues. Instead, CPU 16 temporarily stores the detection result of step S210 or S212 regarding the type of abnormality in the storage unit such as the RAM. Then, the operation proceeds to step S213. When CPU 16 detects no overcurrent in second IPD 12 (NO) in step S211, CPU 16 temporarily stores the detection result indicating that neither the first short-to-supply fault nor the second short-to-ground fault has occurred, and the operation proceeds to step S213.

In steps S213 and S214, CPU 16 forcibly maintains semiconductor switches SW1-SW4 at the on-off combination setting corresponding to the drive mode M3 for the predetermined time T3. Then, even if CPU 16 detects the occurrence of the first short-to-ground fault in step S216 or detects the occurrence of the second short-to-ground fault in step S218, CPU 16 does not immediately make the abnormality diagnosis that determines the occurrence of the detected type of abnormality, and the subroutine continues. Instead, CPU 16 temporarily stores the detection result of step S216 or S218 regarding the type of abnormality in the storage unit such as the RAM, and the operation proceeds to step S219. When CPU 16 detects no overcurrent in second IPD 12 (NO) in step S217, CPU 16 temporarily stores the detection result indicating that neither the first nor second short-to-ground fault has occurred, and the operation proceeds to step S219.

In step S219, based on all the detection results temporarily stored in the storage unit such as the RAM through the abnormality diagnostic procedure of this subroutine, CPU 16 determines whether and what type of an abnormality has occurred in the motor power supply line. When none of the detection results stored in the storage unit such as the RAM indicates any type of abnormality in the motor power supply line, CPU 16 finally makes the abnormality diagnosis that determines the motor power supply line is in a normal condition, and the subroutine ends.

When determining in step S219 that the detection results temporarily stored in the storage unit such as the RAM indicate a single type of abnormality, CPU 16 makes the abnormality diagnosis that determines the occurrence of the detected type of abnormality, and the subroutine ends. For example, when CPU 16 detects the occurrence of the first short-to-ground fault both in steps S204 and S216, the storage unit such as the RAM stores the detection results indicating this single type of abnormality. Accordingly, in this case, CPU 16 makes, in step S219, the abnormality diagnosis for the motor power supply line that determines the occurrence of the first short-to-ground fault.

On the other hand, when determining in step S219 that the detection results temporarily stored in the storage unit such as the RAM indicate two or more types of abnormality, CPU 16 makes no abnormality diagnosis for the motor power supply line, and the subroutine ends.

According to the first to third examples of the subroutine for the abnormality diagnostic procedure on the motor power supply line described above, motor drive control device 1 provides the following effects. Upon detecting an overcurrent, CPU 16 of motor drive controller 1 forcibly maintains semiconductor switches SW1-SW4 at on-off combination settings corresponding respectively to at least two selected ones of the drive modes M1-M3 one after another in a manner that each on-off combination setting is maintained for a predetermine time. When an abnormality has occurred in the motor power supply line, any of the at least two on-off combination settings of semiconductor switches SW1-SW4 allow continuous flow of a short-circuit current depending on the type of the abnormality. Thus, simply by detecting whether an overcurrent is detected in first IPD 11 or in second IPD 12 after each time the selected on-off combination setting is maintained for the predetermined time, CPU 16 is able to easily detect whether and what type of an abnormality has occurred in the motor power supply line.

In the third example of the subroutine for the abnormality diagnostic procedure on the motor power supply line described above, CPU 16 performs the following in step S219. When determining that the detection results temporarily stored in the storage unit such as the RAM indicate two or more types of abnormality, CPU 16 makes no abnormality diagnosis for the motor power supply line, and the subroutine ends. As a result, the operation in the main routine of FIG. 12 returns from step S3 to step S1 so that CPU 16 resumes the drive control processing on motor 3. However, considering that the occurrence of two or more types of abnormality is detected in the abnormality diagnosis procedure for the motor power supply line, it is not preferable to immediately resume the drive control processing on motor 3 as with when it is determined that the motor power supply line is in a normal condition. In view of this, the main routine of the diagnostic processing (see FIG. 12) may be modified as follows so that when CPU 16 fails to determine which type of abnormality has occurred in the motor power supply line in step S219, CPU 16 performs the abnormality diagnostic procedure again to make an abnormality diagnosis rather than resuming the drive control processing on motor 3.

Figure 17:
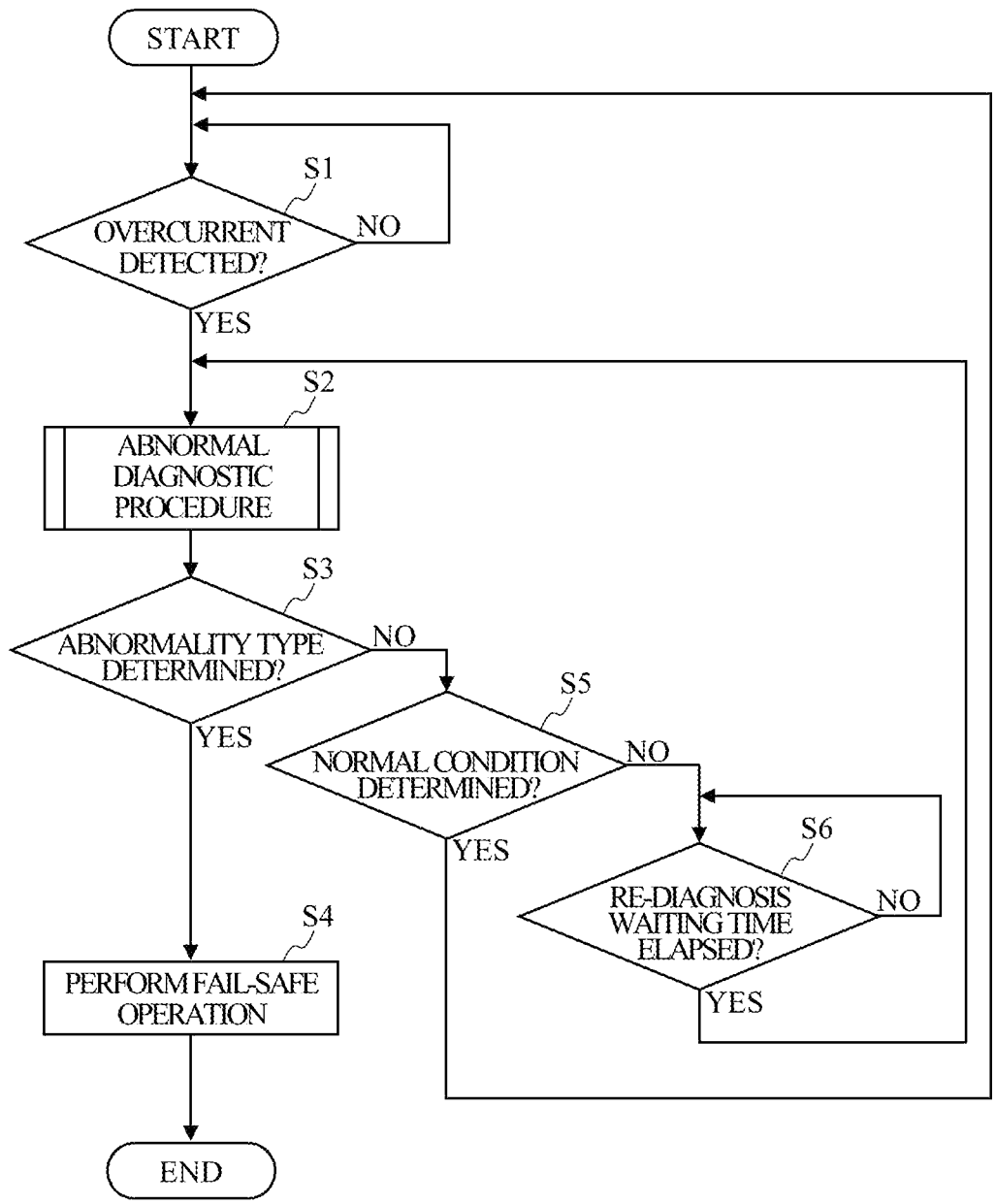
FIG. 17 is a flowchart showing a modification of FIG. 12.

FIG. 17 shows a modification of the main routine (see FIG. 12) of the diagnostic processing. In this modification, steps S5 and S6, which will be described below, are added to the flowchart of FIG. 12. Note that description for steps (steps S1 to S4) having the same reference symbols as in FIG. 12 will be omitted or simplified below.

In step S3, when the type of the abnormality in the motor power supply line has not been determined as a result of the abnormality diagnostic procedure in step S2 (NO), the operation proceeds to step S5. In step S5, when the motor power supply line has been determined to be in a normal condition in step S5 as a result of the abnormality diagnostic procedure in step S2 (YES), CPU 16 resumes the drive control processing on motor 3 and the operation returns to step S1. On the other hand, in step S5, when the motor power supply line has not been determined to be in a normal condition as a result of the abnormality diagnostic procedure in step S2 (NO), the operation proceeds to step S6.

In step S6, CPU 16 determines whether or not a re-diagnosis waiting time has elapsed. The re-diagnosis waiting time is previously specified as an interval time from when the abnormality diagnostic procedure is performed in step S2 to when the abnormality diagnostic procedure is performed again. When CPU 16 determines that the re-diagnosis waiting time has elapsed (YES), the operation proceeds to step S2 so that CPU 16 performs the abnormality diagnostic procedure again. On the other hand, when CPU 16 determines that the re-diagnosis waiting time has not elapsed (NO), step S6 is repeated.

When CPU 16 fails to determine the type of the abnormality in the motor power supply line even after continuously repeating the abnormality diagnostic procedure of step S2, the operation may return from step S5 immediately to step S1 so that CPU 16 may resume the drive control processing on motor 3.

In the above embodiment, the abnormality diagnostic procedure on the motor power supply line in step S2 of FIG. 12 or 17 is performed when an overcurrent is detected in first IPD 11 or second IPD 12 in step S1 while motor 3 is driven. However, the abnormality diagnostic procedure on the motor power supply line need not be necessarily performed in response to detection of an overcurrent, and may be performed at a different timing as described below.

Figure 18:
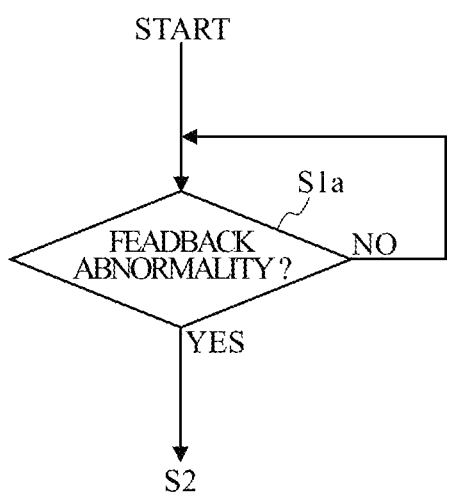
FIG. 18 is a flowchart showing a modification of FIG. 12 or 17.

For example, CPU 16 may perform step S1*a* of FIG. 18 in place of step S1 of FIG. 12 or 17 so as to determine whether or not a feedback abnormality has occurred while performing the drive control processing on motor 3. When determining that a feedback abnormality has occurred (YES) in step S1*a*, CPU 16 may interrupt the drive control processing on motor 3 and the operation may proceed to step S2. In step S2, CPU 16 may perform abnormality diagnostic procedure on the motor power supply line. Whether or not a feedback abnormality has occurred can be diagnosed based on, for example, whether or not the duration of the state in which the actual VTC angle deviates from the target VTC angle by a predetermined amount or more reaches a predetermined time. On the other hand, when CPU 16 determines that no feedback abnormality has occurred (NO) in step S1*a*, step S1*a* is repeated.

Figure 19:
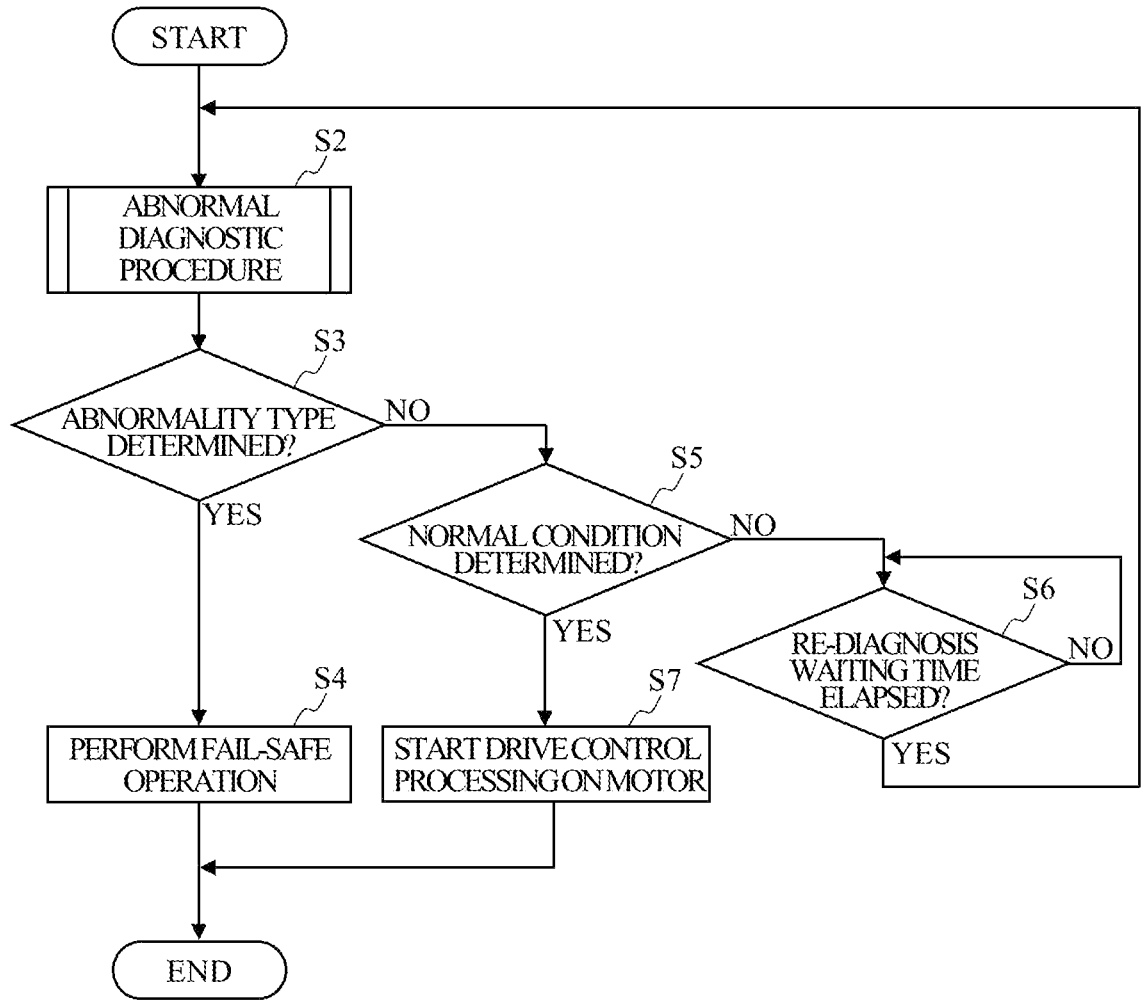
FIG. 19 is a flowchart showing a modification of FIG. 17.

As an alternative example, as shown in FIG. 19, CPU 16 may perform abnormality diagnostic procedure on the motor power supply line before starting the drive control processing on motor 3. FIG. 19 is the same flowchart as that of FIG. 17 except that step S1 of determining whether an overcurrent is detected is omitted and step S7 of starting the drive control processing on motor 3 is added. That is, in step S5, when the motor power supply line has already been determined to be in a normal condition as a result of the abnormality diagnostic procedure in step S2 (YES), the operation proceeds from step S5 to step S7. In step S7, CPU 16 starts the drive control processing on motor 3. On the other hand, when the motor power supply line has not been determined to be in a normal condition as a result of the abnormality diagnostic procedure in step S2 (NO), the operation proceeds step S5 to step S6. In step S6, CPU 16 determines whether or not the re-diagnosis waiting time has elapsed. When CPU 16 determines that the re-diagnosis waiting time has elapsed (YES) in step S6, the operation proceeds to step S2 so that CPU 16 performs the abnormality diagnostic procedure again.

Figure 20:
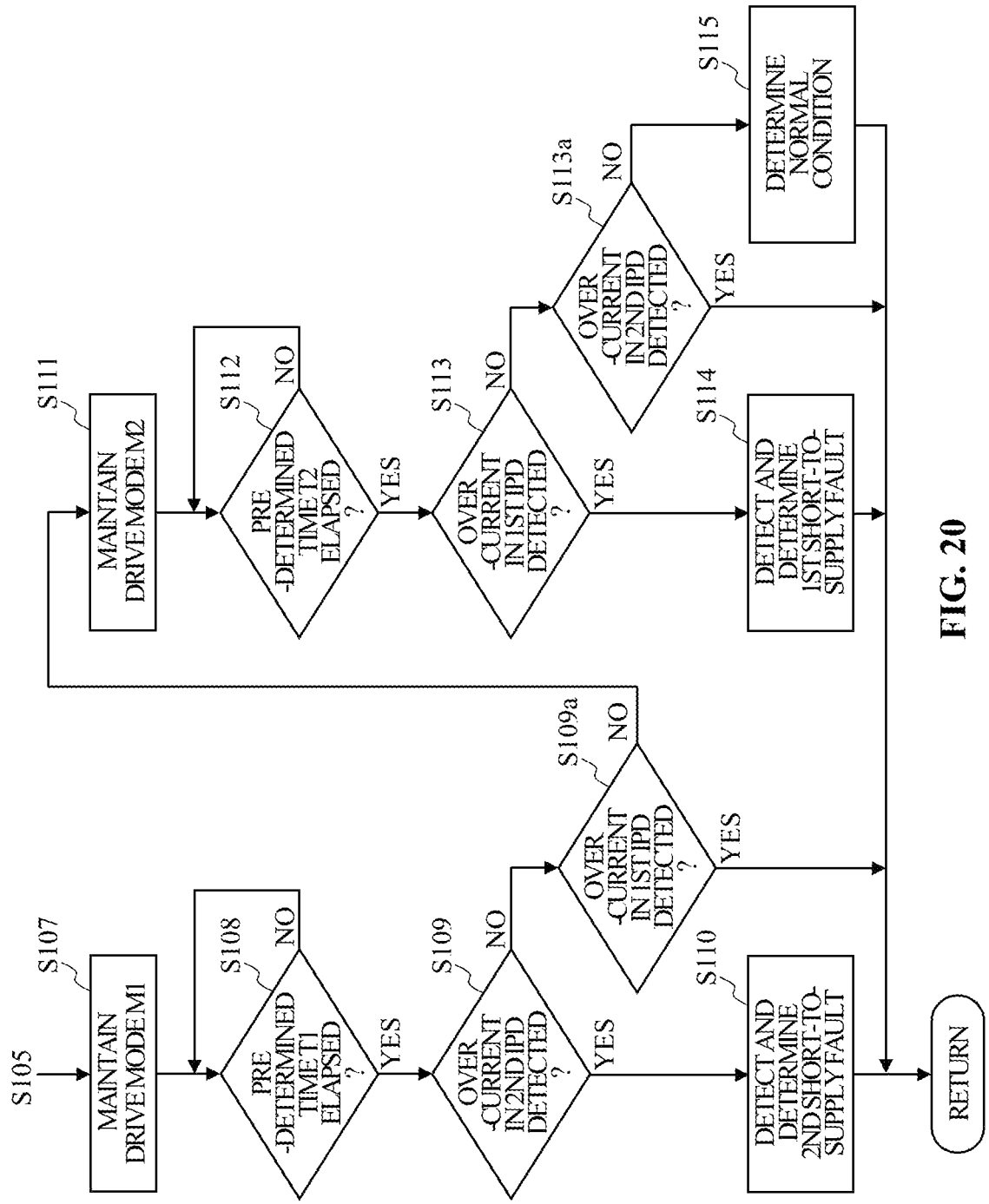
FIG. 20 is a flowchart showing a modification of FIG. 15.

As shown in FIG. 15, in the second example of the abnormality diagnostic procedure, no determination is made as to whether an overcurrent is detected in first IPD 11 when the drive mode M1 is maintained in step S107 and no determination is made as to whether an overcurrent is detected in second IPD 12 when the drive mode M2 is maintained in step S111. However, as shown in FIG. 20, in order to improve the accuracy of the abnormality diagnosis, the flowchart of FIG. 15 may be added with step S109*a* of determining whether an overcurrent is detected in first IPD 11 and step S113*a* of determining whether an overcurrent is detected in second IPD 12.

When determining that an overcurrent is detected in first IPD 11 (YES) in step S109*a*, CPU 16 detects the occurrence of the first short-to-ground fault (see FIG. 4A). However, the occurrence of the first short-to-ground fault is not detected based on the determination in step S103 performed when semiconductor switches SW1-SW4 are forcibly maintained at the on-off combination setting corresponding to the drive mode M3 in step S101. This means that the detection result based on the determination in step S109a disagrees with the detection result based on the determination in step S103. Thus, when determining in step S109a that an overcurrent is detected in first IPD 11, CPU 16 does not determine the type of abnormality, and the abnormality diagnostic subroutine ends. On the other hand, when CPU 16 determines that an overcurrent is not detected in first IPD 11 (NO) in step S109a, the operation proceeds to step S111.

Similarly, when determining that an overcurrent is detected in second IPD 12 (YES) in step S113a, CPU 16 detects the occurrence of the second short-to-ground fault (see FIG. 6B). However, the occurrence of the second short-to-ground fault is not detected based on the determination in step S105 performed when semiconductor switches SW1-SW4 are forcibly maintained at the on-off combination setting corresponding to the drive mode M3 in step S101. This means that the detection result based on the determination in step S113a disagrees with the detection result based on the determination in step S105. Thus, when determining in step S113a that an overcurrent is detected in second IPD 12, CPU 16 does not determine the type of abnormality, and the abnormality diagnostic subroutine ends. On the other hand, when CPU 16 determines that no overcurrent is detected in second IPD 12 (NO) in step S113a, the operation proceeds to step S115. In step S115, CPU 16 makes the abnormality diagnosis that determines the motor power supply line is in a normal condition. Then, the abnormality diagnostic subroutine ends.

REFERENCE SYMBOL LIST

1 Motor drive controller
3 Motor
4a, 4b Electric harness
11 First IPD
11a Signal control unit
11b Overcurrent monitoring unit
12 Second IPD
12a Signal control unit
12b Overcurrent monitoring unit
16 CPU
SW1-SW4 Semiconductor switch
PWM1 Pulse width modulation signal
PWM2 Pulse width modulation signal
IS1 Overcurrent detection signal
IS2 Overcurrent detection signal
M1-M3 Drive mode
T1-T3 Predetermined time

The invention claimed is:

1. A motor drive controller comprising:
a driver unit having a plurality of semiconductor switches and configured to use the plurality of semiconductor switches to adjust power supplied from a power source to a motor having a plurality of motor terminals, the plurality of semiconductor switches connecting a motor power supply line to a positive electrode and a negative electrode of the power source, the motor power supply line extending via the motor terminals from the motor;
a control unit configured to output, to the driver unit, a control signal for controlling on and off of the plurality of semiconductor switches; and
an overcurrent monitoring unit configured to monitor for an overcurrent flowing through any of the plurality of semiconductor switches,
wherein the control unit outputs, to the driver unit at a predetermined timing, the control signal for forcibly maintaining the plurality of semiconductor switches at at least two different on-off combination settings one after another in a manner that each on-off combination setting is maintained for a predetermine time,
the at least two different on-off combination settings being selected from
a plurality of on-off combination settings for electrically connecting one motor terminal of the plurality of motor terminals to the positive electrode of the power source and electrically connect a motor terminal other than the one motor terminal of the plurality of motor terminals to the negative electrode of the power source, and
an on-off combination setting for electrically connecting all the plurality of motor terminals to the positive electrode of the power source, and
wherein, each time the predetermined time has elapsed,
the overcurrent monitoring unit detects which of the plurality of semiconductor switches is a location where an overcurrent flows, and
the control unit performs abnormality detection to detect whether and which of an abnormality due to short-to-ground and an abnormality due to short-to-supply has occurred in the motor power supply line based on detection performed by the overcurrent monitoring unit.

2. The motor drive controller according to claim 1, wherein the at least two different on-off combination settings are two on-off combination settings; that is, a first on-off combination setting at which the plurality of semiconductor switches are maintained first; and a second on-off combination setting at which the plurality of semiconductor switches are maintained last, wherein the first on-off combination setting is an on-off combination setting of the plurality of semiconductor switches corresponds to a drive mode for rotating the motor in one direction, and
wherein the second on-off combination setting is an on-off combination setting of the plurality of semiconductor switches corresponds to a drive mode for rotating the motor in a direction opposite to the one direction.

3. The motor drive controller according to claim 1, wherein the predetermined timing is when the overcurrent monitoring unit detects an overcurrent while the motor is driven.

4. The motor drive controller according to claim 3, wherein, among the at least two different on-off combination settings, the plurality of semiconductor switches are maintained first at an on-off combination setting corresponding to a drive mode that is used when an overcurrent is detected by the overcurrent monitoring unit.

5. The motor drive controller according to claim 1, wherein, among the at least two different on-off combination settings, the plurality of semiconductor switches are maintained first at an on-off combination setting corresponding to a drive mode for recirculating a back electromotive current generated in the motor.

6. The motor drive controller according to claim 5, wherein when the control unit fails to determine whether the motor power supply line has an abnormality or is in a normal condition, the control unit performs the abnormality detection again.

7. The motor drive controller according to claim 1,
wherein the at least two different on-off combination settings are three on-off combination settings corresponding to all respective drive modes for driving the motor, and
the control unit determines whether an abnormality due to short-to-ground or short-to-supply has occurred in the motor power supply line, based on all detection results obtained through the abnormality detection that the control unit performs by maintaining the plurality of semiconductor switches at the three on-off combination settings one after another.

8. The motor drive controller according to claim 7, wherein when the control unit determines that the abnormality has occurred, the control unit performs a fail-safe operation.

9. The motor drive controller according to claim 1, wherein when the control unit detects the abnormality has occurred when the predetermined time has elapsed, the control unit immediately determines that the abnormality has occurred and performs a failsafe operation.

10. The motor drive controller according to claim 9, wherein the fail-safe operation is to stop operation of the motor.

11. The motor drive controller according to claim 9, wherein the fail-safe operation is to restrict rotation of the motor in an available direction depending on a type of the abnormality.

12. The motor drive controller according to claim 11, wherein the control unit outputs, to the driver unit, the control signal according to a difference between an actual value and a target value of a control variable for an object driven by the motor, the target value being previously specified for the fail-safe operation in case of an abnormally.

13. The motor drive controller according to claim 11, wherein the control unit stops operation of the motor when an additional abnormality occurs.

14. The motor drive controller according to claim 1, when the predetermined time is less than an interval to when an object driven by the motor starts operation from when the motor starts to be driven.

15. A method for detecting an abnormality in a motor power supply line that connects a motor having a plurality of motor terminals to a plurality of semiconductor switches for adjusting power supplied from a power source to the motor,
the motor power supply line extending via the plurality of motor terminals,
the plurality of semiconductor switches being connected to a positive electrode and a negative electrode of the power source,
the method comprising:
forcibly maintaining, at a predetermined timing, the plurality of semiconductor switches at at least two different on-off combination settings one after another in a manner that each on-off combination setting is maintained for a predetermine time,
the at least two different on-off combination settings being selected from
a plurality of on-off combination settings for electrically connecting one motor terminal of the plurality of motor terminals to the positive electrode of the power source and electrically connect a motor terminal other than the one motor terminal of the plurality of motor terminals to the negative electrode of the power source, and
an on-off combination setting for electrically connecting all the plurality of motor terminals to the positive electrode of the power source;
monitoring for an overcurrent flowing through any of the plurality of semiconductor switches; and
detecting, each time the predetermined time has elapsed, which of the plurality of semiconductor switches is a location where an overcurrent flows, so as to detect whether and which of an abnormality due to short-to-ground and an abnormality due to short-to-supply has occurred in the motor power supply line.

* * * * *